US010001898B1

(12) United States Patent
Burtenshaw et al.

(10) Patent No.: US 10,001,898 B1
(45) Date of Patent: Jun. 19, 2018

(54) AUTOMATED PROVISIONING OF RELATIONAL INFORMATION FOR A SUMMARY DATA VISUALIZATION

(71) Applicant: Domo, Inc., American Fork, UT (US)

(72) Inventors: Jeff Burtenshaw, West Jordan, UT (US); Alan Winters, Lindon, UT (US)

(73) Assignee: Domo, Inc., American Fork, UT (US)

( * ) Notice: Subject to any disclaimer, the term of this patent is extended or adjusted under 35 U.S.C. 154(b) by 33 days.

(21) Appl. No.: 14/082,802

(22) Filed: Nov. 18, 2013

Related U.S. Application Data

(63) Continuation-in-part of application No. 13/535,019, filed on Jun. 27, 2012, now Pat. No. 9,202,297.

(60) Provisional application No. 61/763,325, filed on Feb. 11, 2013, provisional application No. 61/506,912, filed on Jul. 12, 2011.

(51) Int. Cl.
  *G06F 3/0481* (2013.01)
  *G06F 17/30* (2006.01)
  *G06F 3/0484* (2013.01)
  *G06T 11/20* (2006.01)

(52) U.S. Cl.
  CPC .......... *G06F 3/0481* (2013.01); *G06F 3/0484* (2013.01); *G06F 17/30572* (2013.01); *G06T 11/206* (2013.01)

(58) Field of Classification Search
  CPC .... G06F 3/0481; G06F 3/0488; G06F 3/0482; G06F 3/04842
  USPC ................... 715/769, 810; 345/440; 434/430
  See application file for complete search history.

(56) References Cited

U.S. PATENT DOCUMENTS

| | | |
|---|---|---|
| 5,359,712 A | 10/1994 | Cohen et al. |
| 5,375,201 A | 12/1994 | Davoust |
| 5,416,895 A | 5/1995 | Anderson et al. |
| 5,423,033 A | 6/1995 | Yuen |
| 5,461,708 A | 10/1995 | Kahn |
| 5,550,964 A | 8/1996 | Davoust |
| 5,581,678 A | 12/1996 | Kahn |
| 5,586,240 A | 12/1996 | Khan et al. |
| 5,600,775 A | 2/1997 | King et al. |
| 5,625,767 A | 4/1997 | Bartell et al. |
| 5,634,133 A | 5/1997 | Kelley |
| 5,689,667 A | 11/1997 | Kurtenbach |
| 5,737,557 A | 4/1998 | Sullivan |
| 5,844,558 A | 12/1998 | Kumar et al. |
| 5,929,854 A | 7/1999 | Ross |

(Continued)

*Primary Examiner* — Kieu Vu
*Assistant Examiner* — Roberto Borja
(74) *Attorney, Agent, or Firm* — Patent Law Works LLP

(57) ABSTRACT

A related information provision system may be used to identify constituent data for a selected portion of summary data on a summary data visualization such as a chart or graph. The portion of the summary data may be selected by a user, a system event, and/or another process. The constituent data may include values and/or metadata for one or more data sets summarized by the summary data, formulas and/or other information, which may indicate how the summary data are obtained from the constituent data. Information regarding the constituent data ("related information") may be displayed for a user on a constituent visualization or the like. If the information is already displayed, the system may draw the user's attention to the information. If the information is displayed in a different view, the system may display a navigational element leading to it, or direct the user's attention to an existing navigational element.

34 Claims, 16 Drawing Sheets

(56) References Cited

U.S. PATENT DOCUMENTS

| | | |
|---|---|---|
| 5,933,823 A | 8/1999 | Cullen et al. |
| 59,704,717 | 10/1999 | Hill |
| 5,990,888 A * | 11/1999 | Blades .................. G06T 11/206 715/764 |
| 6,016,502 A | 1/2000 | Haneda et al. |
| 6,023,280 A | 2/2000 | Becker et al. |
| 6,298,174 B1 | 10/2001 | Lantrip et al. |
| 6,484,168 B1 | 11/2002 | Pennock et al. |
| 6,529,217 B1 | 3/2003 | Maguire, III et al. |
| 6,577,304 B1 | 6/2003 | Yablonski et al. |
| 6,613,100 B2 | 9/2003 | Miller |
| 6,626,959 B1 | 9/2003 | Moise et al. |
| 6,707,454 B1 | 3/2004 | Barg et al. |
| 6,904,427 B1 | 6/2005 | Hagiwara et al. |
| 6,940,509 B1 | 9/2005 | Crow et al. |
| 6,985,898 B1 | 1/2006 | Ripley et al. |
| 6,995,768 B2 | 2/2006 | Jou et al. |
| 7,002,580 B1 | 2/2006 | Aggala et al. |
| 7,103,837 B2 | 9/2006 | Sato |
| 7,249,328 B1 | 7/2007 | Davis |
| 7,353,183 B1 | 4/2008 | Musso |
| 7,421,648 B1 | 9/2008 | Davis |
| 7,522,176 B2 | 4/2009 | Tolle et al. |
| 7,546,522 B2 | 6/2009 | Tolle et al. |
| 7,605,804 B2 | 10/2009 | Wilson |
| 7,685,159 B2 | 3/2010 | Mitchell et al. |
| 7,689,933 B1 | 3/2010 | Parsons |
| 7,705,847 B2 | 4/2010 | Helfman et al. |
| 7,788,606 B2 | 8/2010 | Patel et al. |
| 7,809,582 B2 | 10/2010 | Wessling et al. |
| 8,089,653 B2 | 1/2012 | Kobashi |
| 8,099,674 B2 | 1/2012 | Mackinlay et al. |
| 8,145,600 B1 | 3/2012 | Lewis et al. |
| 8,176,096 B2 | 5/2012 | Allyn et al. |
| 8,185,839 B2 | 5/2012 | Jalon et al. |
| 8,201,096 B2 | 6/2012 | Robert et al. |
| 8,214,747 B1 | 7/2012 | Yankovich et al. |
| 8,245,156 B2 | 8/2012 | Mouilleseaux |
| 8,261,194 B2 | 9/2012 | Billiard et al. |
| 8,296,654 B2 | 10/2012 | Ahlberg et al. |
| 8,434,007 B2 | 4/2013 | Morita |
| 8,463,790 B1 | 6/2013 | Joshi et al. |
| 8,468,466 B2 | 6/2013 | Cragun |
| 8,499,284 B2 | 7/2013 | Pich et al. |
| 8,549,432 B2 | 10/2013 | Warner |
| 8,566,700 B2 | 10/2013 | Ueda |
| 8,579,814 B2 | 11/2013 | Fotiades et al. |
| 8,621,391 B2 | 12/2013 | Leffert et al. |
| 8,624,858 B2 | 1/2014 | Fyke |
| 8,627,233 B2 | 1/2014 | Cragun |
| 8,645,863 B2 | 2/2014 | Mandic et al. |
| 8,661,358 B2 | 2/2014 | Duncker et al. |
| 8,667,418 B2 | 3/2014 | Chaudhri et al. |
| 8,671,343 B2 | 3/2014 | Oberstein |
| 8,683,389 B1 | 3/2014 | Bar-Yam et al. |
| 8,707,192 B2 | 4/2014 | Robert et al. |
| 8,713,467 B1 | 4/2014 | Goldenberg et al. |
| 8,812,947 B1 | 8/2014 | Maoz et al. |
| 8,826,178 B1 | 9/2014 | Zhang |
| 8,826,181 B2 | 9/2014 | Mouilleseaux |
| 8,863,019 B2 | 10/2014 | Pourshahid et al. |
| 8,886,622 B1 | 11/2014 | Parent et al. |
| 8,959,423 B2 | 2/2015 | Hammoud |
| 9,026,944 B2 | 5/2015 | Kotler |
| 9,086,794 B2 | 7/2015 | Gil |
| 9,182,900 B2 | 11/2015 | Choi |
| 9,195,368 B2 | 11/2015 | Kuscher |
| 9,201,589 B2 | 12/2015 | Nasraoui |
| 9,202,297 B1 | 12/2015 | Winters |
| 9,235,978 B1 | 1/2016 | Charlton |
| 9,250,789 B2 | 2/2016 | Kobayashi |
| 9,251,722 B2 | 2/2016 | Miyazawa |
| 9,261,989 B2 | 2/2016 | Kuscher |
| 9,280,263 B2 | 3/2016 | Kim |
| 9,292,199 B2 | 3/2016 | Choi |
| 9,299,170 B1 | 3/2016 | Moon |
| 9,310,993 B2 | 4/2016 | Choi |
| 9,329,769 B2 | 5/2016 | Sekiguchi |
| 9,354,780 B2 | 5/2016 | Miyake |
| 9,367,198 B2 | 6/2016 | Radakovitz |
| 9,390,349 B2 | 7/2016 | Awano |
| 9,400,997 B2 | 7/2016 | Beaver |
| 9,424,333 B1 | 8/2016 | Bisignani et al. |
| 9,459,791 B2 | 10/2016 | Mouilleseaux |
| 9,582,187 B2 | 2/2017 | Gil |
| 9,612,736 B2 | 4/2017 | Lee |
| 9,652,056 B2 | 5/2017 | Park |
| 9,658,766 B2 | 5/2017 | Nan |
| 9,733,796 B2 | 8/2017 | Warner |
| 9,817,548 B2 | 11/2017 | Lai |
| 9,886,183 B2 | 2/2018 | Lee |
| 2002/0087894 A1 | 7/2002 | Foley et al. |
| 2002/0091678 A1 | 7/2002 | Miller et al. |
| 2003/0028504 A1 | 2/2003 | Burgoon et al. |
| 2003/0069873 A1 | 4/2003 | Fox et al. |
| 2003/0074292 A1 * | 4/2003 | Masuda ........................ 705/35 |
| 2003/0128883 A1 | 7/2003 | Kim et al. |
| 2003/0158855 A1 | 8/2003 | Farnham et al. |
| 2003/0193502 A1 | 10/2003 | Patel et al. |
| 2004/0150668 A1 | 8/2004 | Myers |
| 2004/0189717 A1 * | 9/2004 | Conally ................ G06F 3/0481 715/853 |
| 2004/0230599 A1 | 11/2004 | Moore |
| 2005/0068320 A1 | 3/2005 | Jaeger |
| 2005/0091254 A1 | 4/2005 | Stabb et al. |
| 2005/0091612 A1 | 4/2005 | Stabb et al. |
| 2005/0134578 A1 | 6/2005 | Chambers et al. |
| 2005/0246643 A1 | 11/2005 | Gusmorino et al. |
| 2005/0275622 A1 | 12/2005 | Patel et al. |
| 2005/0278621 A1 | 12/2005 | Wessling et al. |
| 2006/0004718 A1 | 1/2006 | McCully et al. |
| 2006/0020623 A1 * | 1/2006 | Terai .................... G06F 9/4411 |
| 2006/0026535 A1 | 2/2006 | Hotelling |
| 2006/0036950 A1 | 2/2006 | Himberger et al. |
| 2006/0041178 A1 | 2/2006 | Viswanathan et al. |
| 2006/0095865 A1 | 5/2006 | Rostom |
| 2006/0136819 A1 | 6/2006 | Tolle |
| 2006/0242164 A1 | 10/2006 | Evans et al. |
| 2006/0244735 A1 | 11/2006 | Wilson |
| 2006/0288284 A1 | 12/2006 | Peters et al. |
| 2007/0008300 A1 | 1/2007 | Yang |
| 2007/0061714 A1 | 3/2007 | Stuple et al. |
| 2007/0083911 A1 | 4/2007 | Madden |
| 2007/0094592 A1 | 4/2007 | Turner et al. |
| 2007/0124677 A1 | 5/2007 | de los Reyes |
| 2007/0171716 A1 | 7/2007 | Wright et al. |
| 2007/0179969 A1 | 8/2007 | Finley et al. |
| 2007/0186173 A1 | 8/2007 | Both et al. |
| 2007/0186177 A1 | 8/2007 | Both et al. |
| 2007/0186186 A1 | 8/2007 | Both et al. |
| 2007/0189737 A1 | 8/2007 | Chaudhri |
| 2007/0245238 A1 * | 10/2007 | Fugitt .................... G06F 3/0481 715/700 |
| 2007/0256029 A1 | 11/2007 | Maxwell |
| 2007/0271528 A1 | 11/2007 | Park |
| 2008/0037051 A1 | 2/2008 | Otsubo |
| 2008/0115049 A1 | 5/2008 | Tolle et al. |
| 2008/0136754 A1 | 6/2008 | Tsuzaki |
| 2008/0168404 A1 | 7/2008 | Ording |
| 2008/0195639 A1 | 8/2008 | Freeman et al. |
| 2008/0244454 A1 | 10/2008 | Shibaike |
| 2008/0307343 A1 | 12/2008 | Robert et al. |
| 2009/0006318 A1 | 1/2009 | Lehtipalo et al. |
| 2009/0007012 A1 | 1/2009 | Mandic |
| 2009/0024411 A1 | 1/2009 | Albro et al. |
| 2009/0070301 A1 | 3/2009 | McLean et al. |
| 2009/0077501 A1 | 3/2009 | Partridge et al. |
| 2009/0096812 A1 | 4/2009 | Boixel et al. |
| 2009/0106674 A1 | 4/2009 | Bray et al. |
| 2009/0150177 A1 | 6/2009 | Buck et al. |
| 2009/0164171 A1 | 6/2009 | Wold et al. |
| 2009/0210814 A1 | 8/2009 | Agrusa et al. |
| 2009/0235155 A1 | 9/2009 | Ueda |
| 2009/0282325 A1 | 11/2009 | Radakovitz et al. |

(56) References Cited

U.S. PATENT DOCUMENTS

| | | |
|---|---|---|
| 2009/0307213 A1 | 12/2009 | Deng et al. |
| 2009/0307622 A1 | 12/2009 | Jalon et al. |
| 2009/0307626 A1 | 12/2009 | Jalon et al. |
| 2009/0319897 A1 | 12/2009 | Kotler et al. |
| 2009/0327213 A1 | 12/2009 | Choudhary |
| 2009/0327955 A1 | 12/2009 | Mouilleseaux |
| 2009/0327963 A1 | 12/2009 | Mouilleseaux |
| 2009/0327964 A1 | 12/2009 | Mouilleseaux |
| 2010/0005008 A1 | 1/2010 | Duncker et al. |
| 2010/0005411 A1* | 1/2010 | Duncker et al. ............ 715/769 |
| 2010/0067048 A1 | 3/2010 | Suzuki |
| 2010/0070254 A1 | 3/2010 | Tsai et al. |
| 2010/0077354 A1 | 3/2010 | Russo |
| 2010/0080491 A1 | 4/2010 | Ohnishi |
| 2010/0083172 A1* | 4/2010 | Breeds et al. ............... 715/810 |
| 2010/0083190 A1 | 4/2010 | Roberts |
| 2010/0097322 A1 | 4/2010 | Hu et al. |
| 2010/0097338 A1 | 4/2010 | Miyashita |
| 2010/0100849 A1 | 4/2010 | Fram |
| 2010/0138766 A1 | 6/2010 | Nakajima |
| 2010/0157354 A1 | 6/2010 | Darwish |
| 2010/0161374 A1* | 6/2010 | Horta et al. ...................... 705/9 |
| 2010/0162152 A1 | 6/2010 | Allyn et al. |
| 2010/0185962 A1 | 7/2010 | Zhang et al. |
| 2010/0188353 A1 | 7/2010 | Yoon |
| 2010/0192102 A1 | 7/2010 | Chmielewski |
| 2010/0192103 A1 | 7/2010 | Cragun |
| 2010/0194778 A1 | 8/2010 | Robertson et al. |
| 2010/0199202 A1 | 8/2010 | Becker et al. |
| 2010/0205563 A1 | 8/2010 | Haapsaari |
| 2010/0211895 A1 | 8/2010 | Mistry et al. |
| 2010/0218115 A1 | 8/2010 | Curtin et al. |
| 2010/0231536 A1 | 9/2010 | Chaudhri et al. |
| 2010/0235771 A1 | 9/2010 | Gregg, III |
| 2010/0238176 A1 | 9/2010 | Guo et al. |
| 2010/0251179 A1 | 9/2010 | Cragun |
| 2010/0251180 A1 | 9/2010 | Cragun |
| 2010/0275144 A1 | 10/2010 | Dejoras et al. |
| 2010/0275159 A1 | 10/2010 | Matsubara |
| 2010/0283750 A1 | 11/2010 | Kang |
| 2010/0299637 A1 | 11/2010 | Chmielewski |
| 2010/0299638 A1 | 11/2010 | Choi |
| 2010/0306702 A1 | 12/2010 | Warner |
| 2010/0312462 A1 | 12/2010 | Gueziec et al. |
| 2010/0312803 A1 | 12/2010 | Gong et al. |
| 2010/0332511 A1 | 12/2010 | Stockton et al. |
| 2011/0004821 A1 | 1/2011 | Miyazawa |
| 2011/0016390 A1 | 1/2011 | Oh |
| 2011/0016433 A1 | 1/2011 | Shipley |
| 2011/0018806 A1 | 1/2011 | Yano |
| 2011/0055691 A1 | 3/2011 | Carlen et al. |
| 2011/0055760 A1 | 3/2011 | Drayton |
| 2011/0074696 A1 | 3/2011 | Rapp |
| 2011/0074716 A1 | 3/2011 | Ono |
| 2011/0074718 A1 | 3/2011 | Yeh |
| 2011/0115814 A1 | 5/2011 | Heimendinger et al. |
| 2011/0141031 A1 | 6/2011 | McCullough et al. |
| 2011/0173569 A1 | 7/2011 | Howes et al. |
| 2011/0179376 A1 | 7/2011 | Berestov et al. |
| 2011/0188760 A1 | 8/2011 | Wright et al. |
| 2011/0209048 A1 | 8/2011 | Scott et al. |
| 2011/0270851 A1 | 11/2011 | Mishina et al. |
| 2011/0271233 A1 | 11/2011 | Radakovitz et al. |
| 2011/0276603 A1 | 11/2011 | Bojanic et al. |
| 2011/0279363 A1 | 11/2011 | Shoji et al. |
| 2011/0283231 A1 | 11/2011 | Richstein et al. |
| 2011/0291988 A1 | 12/2011 | Bamji et al. |
| 2011/0302490 A1 | 12/2011 | Koarai |
| 2011/0320458 A1 | 12/2011 | Karana |
| 2012/0011437 A1 | 1/2012 | James et al. |
| 2012/0032901 A1 | 2/2012 | Kwon |
| 2012/0036434 A1 | 2/2012 | Oberstein |
| 2012/0050192 A1 | 3/2012 | Kobayashi |
| 2012/0056836 A1 | 3/2012 | Cha |
| 2012/0081375 A1 | 4/2012 | Robert et al. |
| 2012/0084644 A1 | 4/2012 | Robert |
| 2012/0089933 A1 | 4/2012 | Garand et al. |
| 2012/0092286 A1 | 4/2012 | O'Prey et al. |
| 2012/0127206 A1 | 5/2012 | Thompson et al. |
| 2012/0162265 A1 | 6/2012 | Heinrich et al. |
| 2012/0166470 A1 | 6/2012 | Baumgaertel et al. |
| 2012/0174034 A1 | 7/2012 | Chae et al. |
| 2012/0180002 A1 | 7/2012 | Campbell et al. |
| 2012/0210275 A1 | 8/2012 | Park |
| 2012/0254783 A1 | 10/2012 | Pourshahid et al. |
| 2012/0262489 A1 | 10/2012 | Caliendo, Jr. |
| 2012/0306748 A1 | 12/2012 | Fleizach |
| 2012/0319977 A1 | 12/2012 | Kuge |
| 2013/0002802 A1 | 1/2013 | Mock |
| 2013/0007577 A1 | 1/2013 | Hammoud |
| 2013/0007583 A1 | 1/2013 | Hammoud |
| 2013/0019175 A1 | 1/2013 | Kotler |
| 2013/0019205 A1 | 1/2013 | Gil |
| 2013/0033448 A1 | 2/2013 | Yano et al. |
| 2013/0036380 A1 | 2/2013 | Symons |
| 2013/0047125 A1 | 2/2013 | Kangas et al. |
| 2013/0076668 A1 | 3/2013 | Maeda |
| 2013/0080444 A1 | 3/2013 | Wakefield et al. |
| 2013/0093782 A1 | 4/2013 | Wakefield et al. |
| 2013/0097177 A1 | 4/2013 | Fan et al. |
| 2013/0097544 A1 | 4/2013 | Parker et al. |
| 2013/0104079 A1 | 4/2013 | Yasui |
| 2013/0114913 A1 | 5/2013 | Nagarajan et al. |
| 2013/0127911 A1 | 5/2013 | Brown |
| 2013/0145244 A1 | 6/2013 | Rothschiller et al. |
| 2013/0169549 A1 | 7/2013 | Seymour |
| 2013/0174032 A1 | 7/2013 | Tse et al. |
| 2013/0201106 A1 | 8/2013 | Naccache |
| 2013/0204862 A1 | 8/2013 | Marchiori |
| 2013/0219340 A1 | 8/2013 | Linge |
| 2013/0222340 A1 | 8/2013 | Ito |
| 2013/0235071 A1 | 9/2013 | Ubillos |
| 2013/0293672 A1 | 11/2013 | Suzuki |
| 2013/0346906 A1 | 12/2013 | Farago |
| 2014/0019899 A1 | 1/2014 | Cheng et al. |
| 2014/0022192 A1 | 1/2014 | Hatanaka |
| 2014/0033127 A1 | 1/2014 | Choi |
| 2014/0047380 A1 | 2/2014 | Mak |
| 2014/0071063 A1 | 3/2014 | Kuscher |
| 2014/0075388 A1 | 3/2014 | Kuscher |
| 2014/0089828 A1 | 3/2014 | Okuma |
| 2014/0111516 A1 | 4/2014 | Hall et al. |
| 2014/0129564 A1 | 5/2014 | Kritt et al. |
| 2014/0157200 A1 | 6/2014 | Jeon |
| 2014/0173457 A1 | 6/2014 | Wang et al. |
| 2014/0173530 A1 | 6/2014 | Mesguich Havilio |
| 2014/0210759 A1 | 7/2014 | Toriyama |
| 2014/0215365 A1 | 7/2014 | Hiraga |
| 2014/0245217 A1 | 8/2014 | Asahara |
| 2014/0282145 A1 | 9/2014 | Dewan |
| 2014/0331179 A1 | 11/2014 | Tullis et al. |
| 2015/0009157 A1 | 1/2015 | Chung |
| 2015/0012854 A1 | 1/2015 | Choi |
| 2015/0135109 A1 | 5/2015 | Zambetti |
| 2015/0143233 A1 | 5/2015 | Weksler et al. |
| 2015/0160843 A1 | 6/2015 | Kim |
| 2015/0169530 A1 | 6/2015 | Otero et al. |
| 2015/0169531 A1 | 6/2015 | Campbell et al. |
| 2015/0212688 A1 | 7/2015 | Mcmillan |
| 2015/0234562 A1 | 8/2015 | Ording |
| 2015/0261728 A1 | 9/2015 | Davis |
| 2015/0268805 A1 | 9/2015 | Patel |
| 2015/0286636 A1 | 10/2015 | Elkhou et al. |
| 2015/0338974 A1 | 11/2015 | Stone |
| 2015/0341212 A1 | 11/2015 | Hsiao et al. |
| 2015/0356160 A1 | 12/2015 | Berwick et al. |
| 2015/0378978 A1 | 12/2015 | Gross et al. |
| 2016/0055232 A1 | 2/2016 | Yang et al. |
| 2016/0070430 A1 | 3/2016 | Kim et al. |
| 2016/0070461 A1 | 3/2016 | Herbordt |
| 2016/0139695 A1 | 5/2016 | Chase |
| 2016/0274686 A1 | 9/2016 | Ruiz |
| 2016/0274733 A1 | 9/2016 | Hasegawa |
| 2016/0274750 A1 | 9/2016 | Stewart |

(56) References Cited

U.S. PATENT DOCUMENTS

| | | |
|---|---|---|
| 2016/0283081 A1 | 9/2016 | Johnston |
| 2016/0306328 A1 | 10/2016 | Ko |
| 2016/0313911 A1 | 10/2016 | Langseth et al. |
| 2016/0364367 A1 | 12/2016 | Takayama |
| 2017/0031587 A1 | 2/2017 | Kimoto |
| 2017/0102838 A1 | 4/2017 | Roy |
| 2017/0109026 A1 | 4/2017 | Ismailov |
| 2017/0147188 A1 | 5/2017 | Rong |
| 2017/0185258 A1 | 6/2017 | Fu |
| 2017/0185281 A1 | 6/2017 | Park |
| 2017/0193058 A1 | 7/2017 | Fung |
| 2017/0315635 A1 | 11/2017 | Chase |
| 2017/0329458 A1 | 11/2017 | Kanemaru |
| 2018/0040154 A1 | 2/2018 | Gibb |

\* cited by examiner

AUTOMATED PROVISIONING OF RELATIONAL INFORMATION FOR A SUMMARY DATA VISUALIZATION

CROSS-REFERENCES TO RELATED APPLICATIONS

The present application claims priority from U.S. Provisional Application Ser. No. 61/763,325 for "Related Measure Highlighting," filed Feb. 11, 2013, which is incorporated by reference herein in its entirety.

The present application further claims priority as a continuation-in-part of U.S. Utility application Ser. No. 13/535,019 for "Dynamic Expansion of Data Visualizations," filed Jun. 27, 2012, which claims priority from U.S. Provisional Application Ser. No. 61/506,912 for "Drill by Expansion," filed Jul. 12, 2011. Both applications are incorporated by reference herein in their entirety.

FIELD OF THE INVENTION

The present invention relates to systems and methods for displaying information to a user, and more particularly, displaying information regarding constituent data used to obtain summary data provided to a user.

DESCRIPTION OF THE RELATED ART

Data visualizations include all ways of graphically representing numerical data, including charts, graphs, infographics, and maps. Data visualizations are widely used to rapidly and concisely convey relationships between and among the various data in a data set. For example, in the context of business management, a data set may include sales revenue broken down by month. Analyzing the raw data may be cumbersome, but a graph of sales revenue over time can rapidly convey comparative performance, sales trends over time, and other useful information to a user such as a business executive.

Many data visualizations may present summary data, which is obtained from other, constituent data. For example, the sales revenue graph mentioned above may be obtained by adding sales data from multiple locations, business units, etc. A graph indicating net profit may display information obtained by subtracting COGS and indirect expenses from revenue.

These data relationships may not be immediately apparent to the user. Thus, although the summary data visualization may efficiently present information to the user, the user may be lacking the proper context to process and use the information. The process of putting the summary data in context may require time-consuming research and/or inquiry. If the constituent data is not obvious to the user, he or she may have to review the underlying data sets and/or formulas, correspond with other users who created the summary data visualization, or undertake other steps to facilitate understanding. The user may also have to take further steps to locate and/or retrieve constituent data and/or related information. These steps may significantly reduce the usefulness of the summary data visualization.

SUMMARY

As set forth above, manually researching the context of summary data can be time-consuming and difficult. The systems and methods of the present invention may address such difficulty by providing mechanisms for automatically presenting information regarding constituent data for a portion of summary data. This may be accomplished without requiring users to know the history, ownership, or other information regarding the summary data. A system according to the invention may present the user with information regarding constituent data used to obtain the summary data, direct the user's attention to such information, and/or direct the user's attention to one or more navigational elements that lead to presentation of such information.

In at least one embodiment of the present invention, a software-based system may, in response to occurrence of a trigger event, display the constituent data for a selected portion of summary data and/or their relationships to the selected portion of the summary data, thus providing the user with context and additional insight into the summary data. The summary data and/or the constituent data may include values in the form of numbers, symbols, text, and/or other data types.

In at least one embodiment, the system may display numerical values in data visualizations. In at least one embodiment, when a summary visualization is being displayed showing summary data in the form of values, the system of the present invention may display subcomponents (i.e., constituent data) and related values of the summary visualization to give meaning, context, and clarification to the summary visualization and/or the selected portion of the summary visualization. The present invention may be implemented as a feature that is triggered in response to user input, or automatically in response to any other suitable trigger event, so as to cause the display of the constituent data and/or related values in response to such input or trigger event.

In at least one embodiment, when a user hovers over a summary visualization or a portion of a summary visualization (such as a value presented by the summary visualization), constituent data and/or related information in the form of individual calculation elements that contribute to the selected value may be shown and/or highlighted. This may include placing a graphical element or number on an information graphic displaying the constituent data, so as to call attention to the relationship between the summary data and the constituent data. Relational information may also be shown, including but not limited to the equation used to determine the value on the summary visualization based on the corresponding values of the constituent data.

As an example, a display may show a single view with data visualizations for three values: a summary data visualization of the profit earned by a company in a year, as well as constituent data visualizations showing income and expenses for that year. When a user hovers over the data visualization representing the profit summary value, both the income and expenses data visualizations may be automatically highlighted. In addition, the display may show how each of the income and expense values contributes to a selected profit summary value from the data visualization showing company profit.

In at least one embodiment, if a constituent calculation element (such as a constituent value and/or operator) is currently represented on the display when the user interacts with the summary data visualization, that individual element may be highlighted, or a navigational element that leads to that element may be highlighted. If the element is not currently displayed, or is not visible within the current view, a constituent data visualization representing the off-screen element may appear. For example, if a summary data visualization is displayed within a tabbed-page view and a constituent data visualization resides on another tab, then, in response to user interaction with the summary data visualization, the tab containing the constituent visualization may automatically be highlighted, thus indicating an off-display relationship. The user can then navigate to the constituent data visualization by following the highlighted tab.

In at least one embodiment, the highlighted navigational element leading to the off-display constituent data visualization may include metadata that provides sufficient context to help the user decide whether or not to navigate to the constituent data visualization. In at least one embodiment, the navigational element itself may allow interaction with the metadata to show the visualization without navigation. For example, the highlighted navigational element may show the named off-display constituent data visualization, indicate the number of constituent data visualizations, summarize the information or graphics of the constituent data visualizations, and/or provide a control to show the constituent data visualizations.

In at least one embodiment, metadata for constituent data may be highlighted and/or shown in association with the constituent element data and/or other related information. Such metadata may encode meaning into its display. For example, if two values contribute to a summary value of a summary data visualization, and one measure decreases the summary value significantly, the lower measure may be highlighted in red.

The present invention may provide several advantages over conventional data visualizations and information displays. In conventional systems, it may be difficult for a user to see relationships between many values presented on a display. In spreadsheets, a user may have to click on a summary cell, inspect the formula, navigate to the first cell that contributes to the formula, inspect its contents, and then repeat the process for each of the cells that contribute to the formula. For more complex calculations, human short-term memory limits may impede easy consumption of a summary value and its constituent values. The system and method of the present invention may allow the user to quickly focus on and understand the constituent values that contribute to a summary value.

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

For illustrative purposes, the methods described and depicted herein may refer to automated provision of information related to a selected portion of a summary data visualization. Provision of information may include displaying and/or drawing user attention to information related to constituent data used to obtain the summary data visualization and/or a navigational element used to access such information. The data visualizations may, in some embodiments, relate to the operation of an enterprise. The user or a system event may select a portion of a summary data set. A related information identification engine may identify information related to constituent data used to obtain the selected portion of the summary data set. A display engine may receive the information and display the information and/or direct the user's attention as set forth above. One skilled in the art will recognize that the techniques of the present invention can be applied to many different types of data visualizations, and may apply to many different situations apart from the exemplary enterprise operation context mentioned previously.

System Architecture

According to various embodiments, the present invention can be implemented on any electronic device equipped to receive, store, and present information. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of receiving and/or processing user input. Accordingly, the following description is intended to illustrate various embodiments of the invention by way of example, rather than to limit the scope of the claimed invention.

Figure 1A:
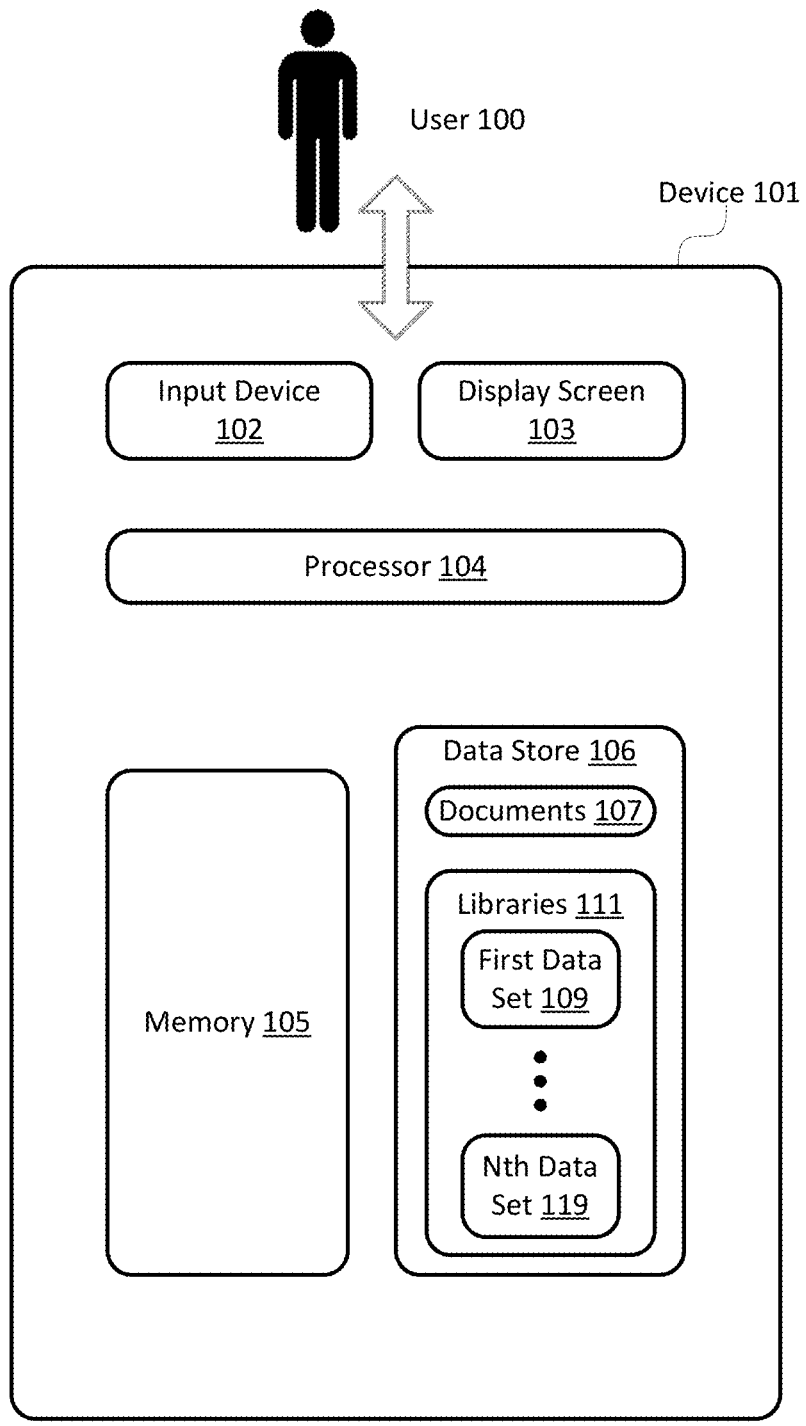
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include documents 107 and/or libraries 111 that can be utilized and/or displayed according to the techniques of the present invention, as described below. In another embodiment, documents 107 and/or libraries 111 can be stored elsewhere, and retrieved by device 101 when needed for presentation to user 100. Libraries 111 may include one or more data sets, including a first data set 109, and optionally, a plurality of additional data sets up to an nth data set 119.

Display screen 103 can be any element that graphically displays documents 107, libraries 111, and/or the results of steps performed on documents 107 and/or libraries 111 to provide data output incident to identification and/or presentation of information related to constituent data used to obtain a summary data visualization. Such data output may include, for example, data visualizations, navigational elements, graphical elements drawing attention to data visualizations or graphical elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Documents 107 and/or libraries 111 can be entered from a source outside of device 101 into a data store 106 that is detachable, and later displayed after the data store 106 is connected to device 101. In another embodiment, data store 106 is fixed within device 101.

Figure 1B:
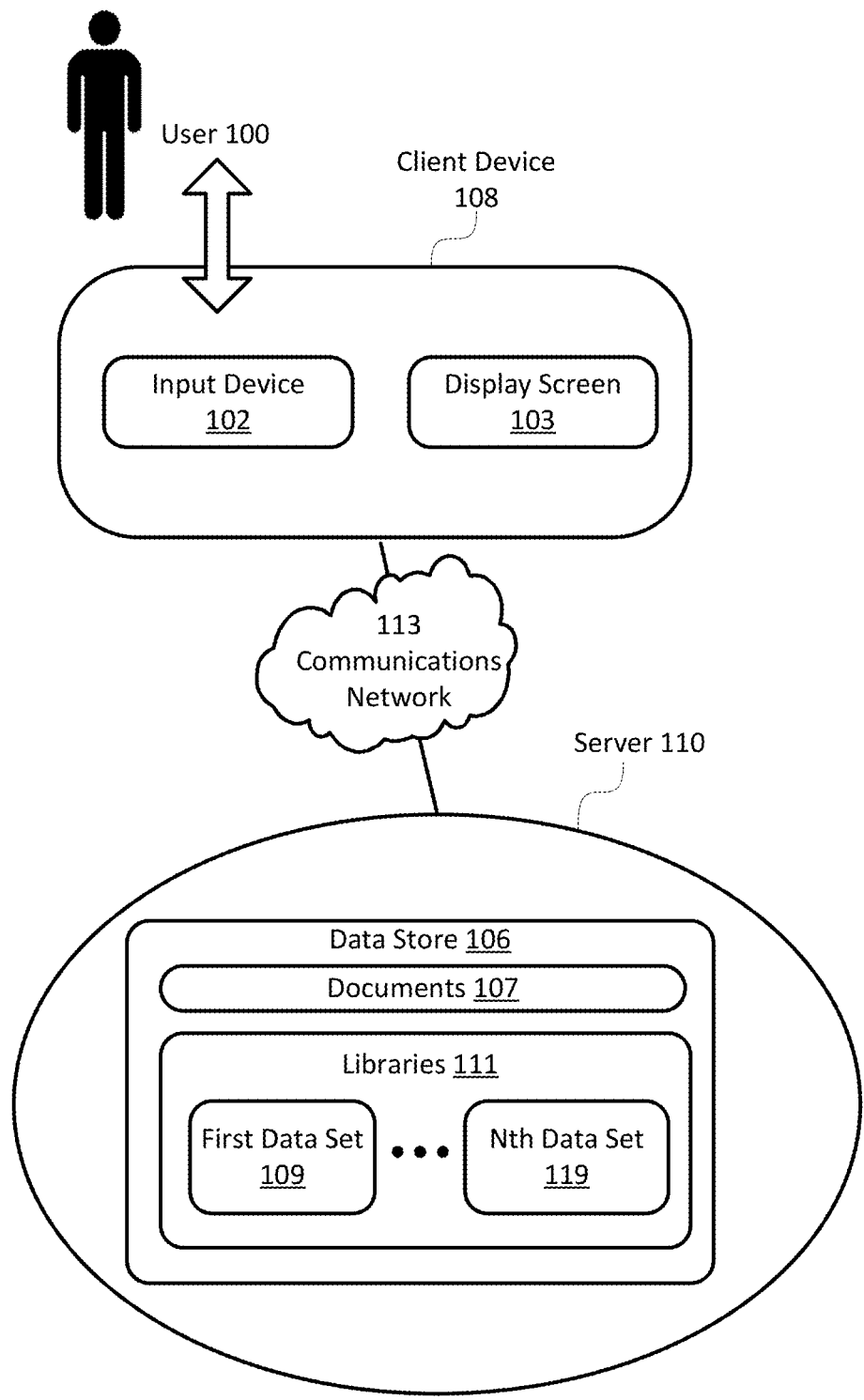
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Documents 107, data, and/or libraries 111 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 113, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 110 containing the requested data.

In this implementation, server 110 is responsible for data storage and processing, and incorporates data store 106 for storing documents 107 and/or libraries 111. Server 110 may include additional components as needed for retrieving data and/or libraries 111 from data store 106 in response to requests from client device 108.

In at least one embodiment, documents 107 are organized into one or more well-ordered data sets, with one or more data entries in each set. Data store 106, however, can have any suitable structure. Accordingly, the particular organization of documents 107 within data store 106 need not resemble the form in which documents 107 are displayed to user 100. In at least one embodiment, an identifying label is also stored along with each data entry, to be displayed along with each data entry.

In at least one embodiment, libraries 111 are organized in a file system within data store 106. Appropriate indexing can be provided to associate particular documents with particular quantitative data elements, reports, other documents, and/or the like. Libraries 111 may include any of a wide variety of data structures known in the database arts. As in FIG. 1A, libraries 111 may include one or more data sets, including a first data set 109, and optionally, a plurality of additional data sets up to an nth data set 119.

Documents 107 can be retrieved from client-based or server-based data store 106, and/or from any other source. In at least one embodiment, input device 102 is configured to receive data entries from user 100, to be added to documents 107 held in data store 106. User 100 may provide such data entries via the hardware and software components described above according to means that are well known to those skilled in the art.

Display screen 103 can be any element that graphically displays documents 107, libraries 111, and/or the results of steps performed on the information in documents 107 and/or libraries 111 to provide data output incident to identification and/or presentation of information related to constituent data used to obtain a summary data visualization. Such data output may include, for example, data visualizations, navigational elements, graphical elements drawing attention to data visualizations or graphical elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Furthermore, as described in more detail below, display screen 103 can selectively present a wide variety of data related to identification and/or presentation of information related to constituent data used to obtain a summary data visualization. In particular, as described herein, user 100 can provide input, such as a selection from a menu containing a variety of options, to determine the various characteristics of the information presented such as the type, scope, and/or format of the information to be displayed on display screen 103.

In one embodiment, the system can be implemented as software written in any suitable computer programming language, whether in a standalone or client/server architecture. Alternatively, it may be implemented and/or embedded in hardware.

Data Set and Visualization Structure

In general, a data set may include one or more pieces of data. Each piece of data may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer.

In some instances, a data set may be stored as an array or with any other storage structure known in the art. A data set may have only a single data series (for example, a quantity measured at a constant time interval, with no attached date information). Alternatively, a data set may have two data series (for example, a quantity measured daily, with the date also stored in association with each daily measurement). Yet further, a data set may have more than two data series (for example, multiple different quantities measured daily, with the date also stored in association with each set of daily measurements).

Figure 2:
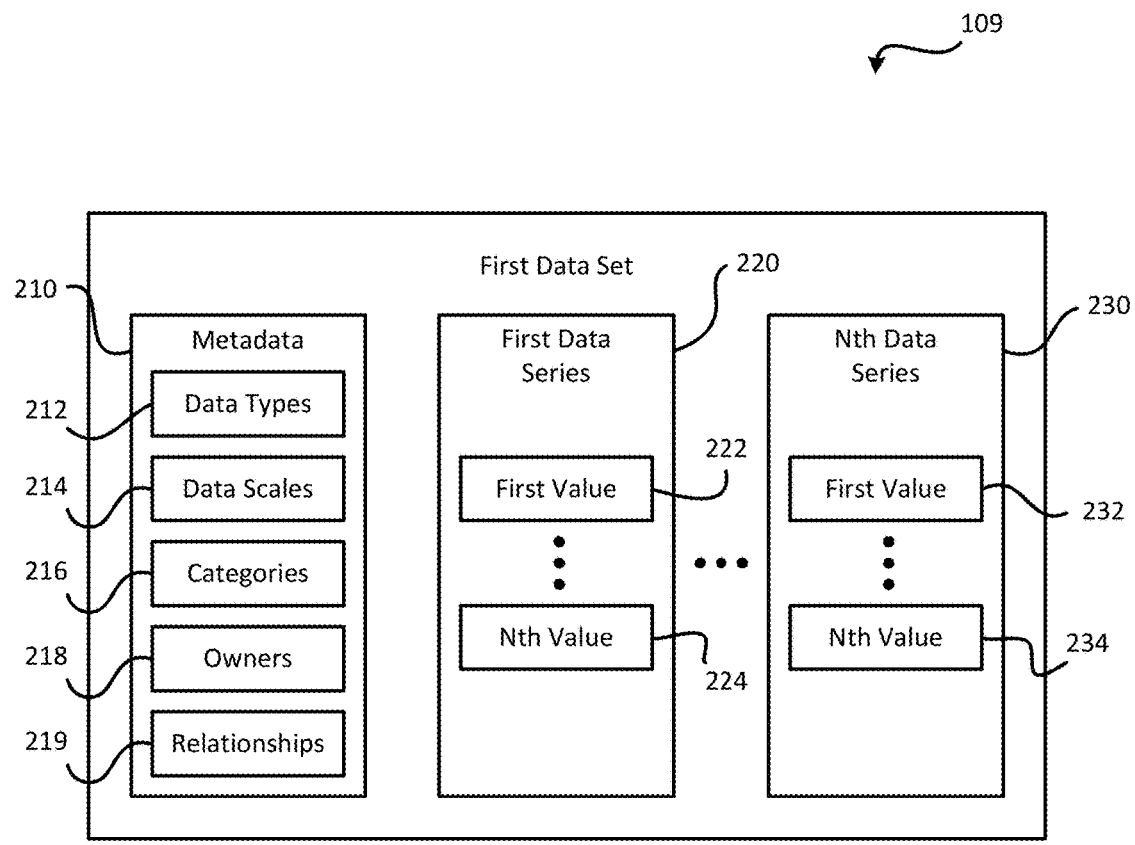
FIG. 2 is a block diagram depicting the structure of a data set according to one embodiment of the present invention.

FIG. 2 is a block diagram depicting the structure of a data set according to one embodiment of the present invention. The data set of FIG. 2 may be, for example, the first data set 109 of FIG. 1A and FIG. 1B.

The first data set 109 may have metadata 210 that provides helpful information about the data stored in the first data set 109. The metadata 210 may permit a user or program to obtain information about the data stored within the first data set 109 without retrieving and/or analyzing any of the data itself. Thus, the metadata 210 may optionally include, but need not be limited to, information such as the data types 212 within the first data set 109, data scales 214 within the first data set 109, categories 216 of data to which some or all of the first data set 109 pertains, owners 218 involved with the first data set 109, and/or relationships the first data set 109 has with other data sets within the libraries 111. The data types 212, the data scales 214, the categories 216, the owners 218, and/or the relationships 219 may be broken down by data series within the first data set 109.

The data type 212 of data may relate to whether the data represents a currency, date, character string, or the like. Further, the data type 212 may provide more detailed information on what the data represents. For example, the data type 212 may specify that the data in a data series of the first data set 109 relates to sales within the northwestern region of the U.S.

The data scales 214 may indicate the scope of the data stored within a data series of the first data set 109. For example, the data scales may indicate that a series of date data begins on Jan. 1, 2009 and terminates on Jun. 30, 2014. Although the scale of a data series may be inferred from retrieving the data and sorting the data to find the highest and lowest values, providing this information within the metadata 210 may make this information more readily obtainable, and may also provide the actual end points for a series that does not include the real end points (for example, data recording began on January 1, but the first data point was not actually obtained until January 3).

The categories 216 may include any grouping that can include one or more data sets. The categories 216 may include multiple categories, as a single data set may belong to multiple categories. The categories 216 may relate to geography, chronology, business units, types of products or services, or any other useful grouping. Thus, for example, if the first data set 109 provides shoe sales revenue in Colorado broken down by month in the year 2010, the categories 216 may include items such as "revenue," "Colorado," "footwear," "2013," and the like. The categories 216 may be specific to one data series within the first data set 109, or may pertain to all data within the first data set 109. The categories 216 may be automatically determined via keyword or other analysis of the other metadata 210 or other data of the first data set 109 and/or selected by the user 100 or another individual, for example, via dropdown menus. If desired, policies may be established by the user 100 or other individuals to guide automated determination of the categories 216.

The owners 218 may include any individual with a relationship to the first data set 109. This may include one or more people who created, modified, have control over, lead business units related to, or are otherwise associated with the first data set. The owners 218 may also be selected automatically or manually as set forth in the description of the categories 216.

The relationships 219 may include reference to any data set to which the first data set 109 is related. Thus, if the first data set 109 is a summary data set that summarizes data from other, constituent data sets, the relationships 219 may reference the constituent data sets. For example, if the first data set 109 relates to net income broken down by month, the relationships 219 may reference constituent data sets that provide the revenue, COGS, and/or indirect expense information used to calculate the net income of the first data set 109. If the first data set 109 is a constituent data set, the relationships 219 may reference other constituent data sets used in combination with the first data set 109 and/or the corresponding summary data set.

The relationships 219 are not limited to summary-constituent relationships, but may include data sets that provide similar types of data, data sets that appear in the same view, or any other relationship that is beneficially tracked by the user 100. The relationship 219 may additionally or alternatively include formulas and/or other information indicating not just the presence of a relationship between data sets, but the manner in which those data sets are related. Thus, the relationships 219 may include mathematical operations or other schema by which data sets are connected to each other. Like the categories 216 and the owners 218, the relationships 219 may be selected automatically or manually.

The system may contain other metadata elements that are common between data visualizations and that establish relationships among data visualizations. These include, but are not limited to, the source system of data, keyword tags, department names, and user data such as business owner, visualization creator, and the person responsible for the data.

In addition to the metadata 210, the first data set 109 may have one or more data series. Thus, the first data set 109 may have a first data series 220, and optionally, additional data series up to an nth data series 230. The first data series 220 may have one or more pieces of data, starting with a first value 222 and optionally, terminating with an nth value 224. Similarly, the nth data series 230 may have one or more pieces of data starting with a first value 232 and, optionally, terminating with an nth value 234. The type and/or scale of each of the data series, from the first data series 220 up to the nth data series 230, may be stored within the data types 212 and/or the data scales 214 of the metadata 210.

A data visualization may include any of a wide variety of ways to represent the data of a data set to facilitate viewing, comprehension, and/or analysis by the user. Thus, a data visualization may include a chart, graph, infographic, map, or any other data representation. The device 101 and/or the client device 108 may facilitate creation of a data visualization of each of the data sets within libraries 111, from the first data set 109 up to the nth data set 119.

Figure 3:
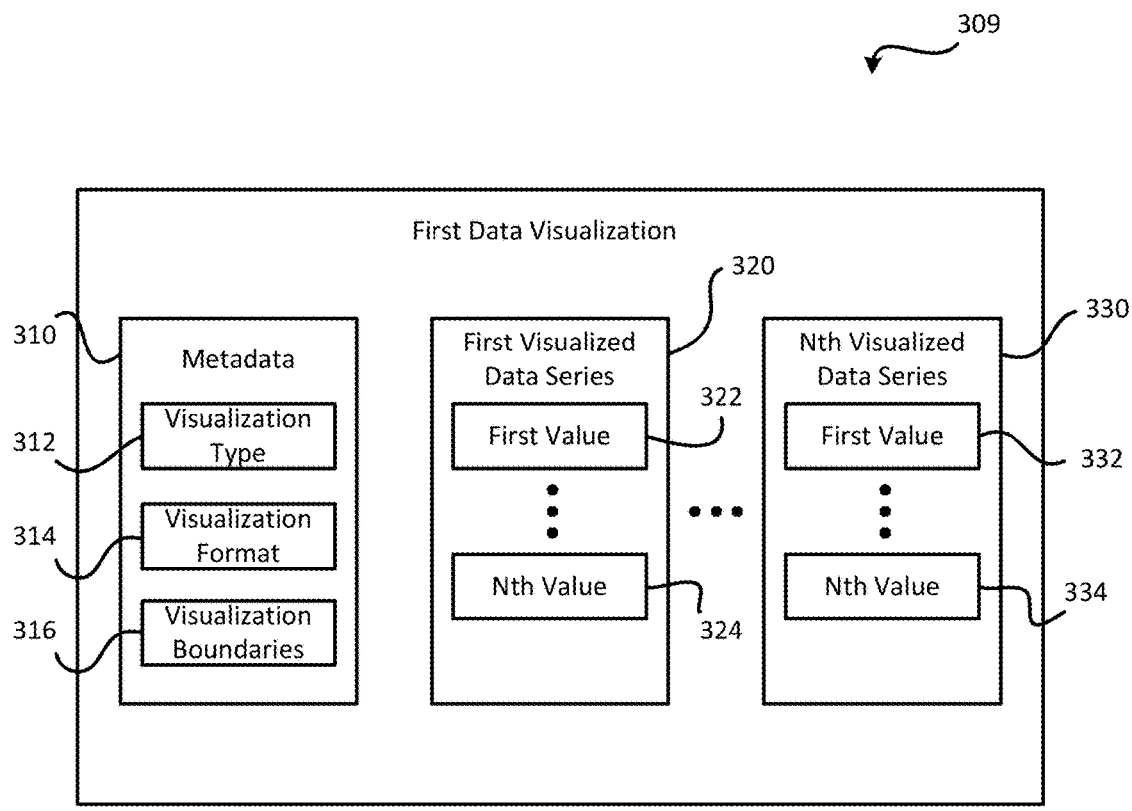
FIG. 3 is a block diagram depicting the structure of a data visualization according to one embodiment of the present invention.

FIG. 3 is a block diagram depicting the structure of a data visualization according to one embodiment of the present invention. The data visualization shown may be a first data visualization 309 based on the first data set 109. Thus, the first data visualization 309 may facilitate viewing, comprehension, and/or analysis of the first data set 109 by the user 100.

Numerical, textual, and/or symbolic values may be represented in data visualizations using any suitable visual schema, including but not limited to numbers, charts, graphs, data tables. Further, numerical values may be represented using infographics that encode quantitative value using one or more visual object attributes such as object size, area, length, saturation, or count. Any suitable combination thereof can be provided. Similarly, values that are textual or based on other characters and/or symbols may be presented in a wide variety of data visualizations.

The first data visualization 309 may have metadata 310, which may also include information regarding the first data visualization 309 and/or the data illustrated by the first data visualization 309. Thus, the metadata 310 may optionally include, but need not be limited to, a visualization type 312, a visualization format 314, and/or visualization boundaries 316. Additionally or alternatively, the metadata 310 of the first data visualization 309 may also include the items present in the metadata 210 for the first data set 109.

The visualization type 312 may specify whether the first data visualization 309 is a chart, graph, infographic, map, or other visualization type. The visualization type 312 may provide further detail about the first data visualization 309 such as, in the case of a graph, whether the graph is a line graph, bar graph, 3D graph, etc. If desired, the visualization type 312 may further provide information regarding the data presented by the first data visualization, such as the data types 212 and/or the data scales 214 of the first data set 109 on which the first data visualization 309 is based.

The visualization format 314 may provide more detailed information regarding the manner in which the first data visualization 309 is formatted. For example, the visualization format 314 may specify which data series of the first data set 109 is shown on each axis of a chart, specify the colors, fonts, and/or shapes to be used for each data series on a map, or the like.

The visualization boundaries 316 may indicate the limits of the first data visualization 309. For example, if the first data visualization 309 is a map, the visualization boundaries 316 may indicate the extents of the map. If the first data visualization 309 is a graph, the visualization boundaries 316 may indicate the end points of each axis.

The various components of the metadata 310, including the visualization type 312, the visualization format 314, and the visualization boundaries 316 may be based on user selections made in the creation of the first data visualization 309. Additionally or alternatively, the metadata 310 may include one or more parameters automatically determined by the device 101 and/or the client device 108 during the creation of the first data visualization 309. In the alternative, the metadata 310 may be omitted, and the information from the metadata 310 may be obtained from the data presented by the first data visualization 309.

The first data visualization 309 may also have a first visualized data series 320 and an nth visualized data series 330, which may correspond to the first data series 220 and the nth data series 230 of the first data set 109. Thus, the first visualized data series 320 may have a first value 322 and, optionally, additional values up to an nth value 324. Similarly, the second visualized data series 330 may have a first value 332 and, optionally, additional values up to an nth value 334. The values of the first visualized data series 320 and the second visualized data series 330 may be the same as (i.e., copies of) those of the first data series 220 and the nth data series 230 of the first data set 109. In the alternative, the first data visualization 309 need not contain the first visualized data series 320 and the second visualized data series 330, but may instead link directly to the first data series 220 and the nth data series 230 of the first data set 109.

As mentioned previously, the device 101 and/or the client device 108 may facilitate creation of a data visualization for each data set of libraries 111. Thus, in addition to the first data visualization 309, there may be one or more data visualizations, up to an nth data visualization (not shown) corresponding to the nth data set 119. These data visualizations may be present on the display screen 103 and/or within a document of documents 107, or may be located elsewhere within the data store 106. Some of these data visualizations may be summary data visualizations presenting data derived from other data sets, some may be constituent data visualizations that present only raw data from their corresponding data sets, and some may be both summary data visualizations and constituent data visualizations.

The present invention may facilitate automated identification of constituent data related to a summary data visualization. According to one example, the automated identification may be initiated by user input. More specifically, the user 100 may click on a portion of a summary data visualization (such as the first data visualization 309) to select the portion of summary data presented in the first data visualization (i.e., a portion of the data of the first data set) for which additional information is desired. The present invention may display for the user and/or draw the user's attention to information related to constituent data and/or navigational elements that can be used to navigate to such information, without the need for the user 100 to manually review the underlying data sets, check relationships, open other files, and/or carry out other steps. One exemplary system that may be used to implement this method will be shown and described subsequently.

Conceptual Architecture

In at least one embodiment, the system of the present invention enables automated provision of information related to constituent data for a selected portion of a summary data visualization by displaying the information and/or navigational elements that can be used to navigate to such information. The information may be identified by searching for a data set and/or a portion of a data set with metadata that matches that of the selected portion of the summary data visualization, retrieving the data sets that were actually used by the process that created the summary data visualization, or the like.

Figure 4:
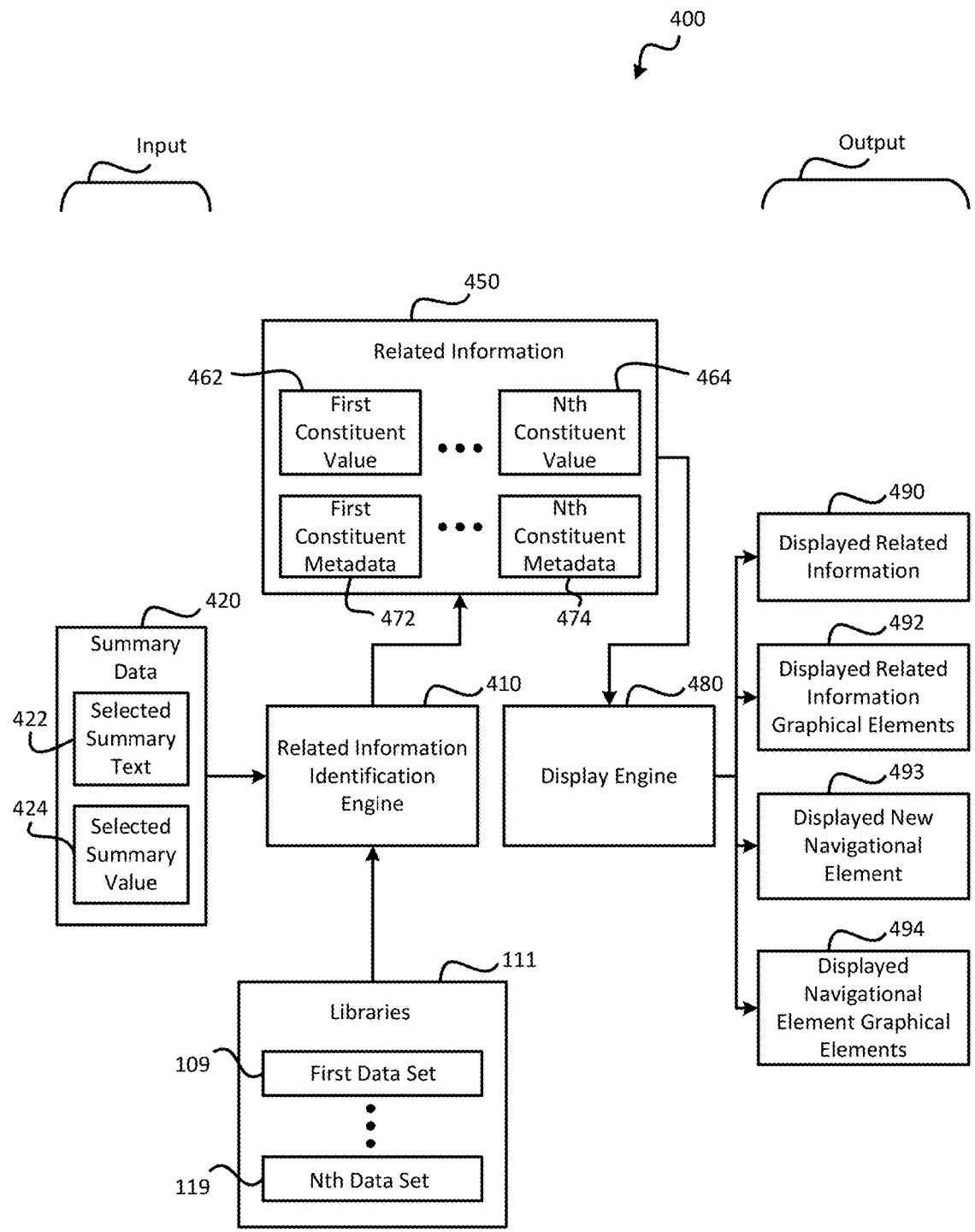
FIG. 4 is a block diagram depicting a system for carrying out automatic information provision, according to one embodiment of the present invention.

FIG. 4 is a block diagram depicting a system 400 for carrying out automatic information provision, according to one embodiment of the present invention. As shown, the system 400 may have a related information identification engine 410 that receives various inputs and, based on those inputs, identifies the related information.

More specifically, the system 400 may receive one or more inputs, which may include summary data 420 from the summary data visualization. Receipt of the summary data 420 may provide a trigger event that initiates the information provision process carried out by the system 400.

The summary data 420 may optionally include selected summary text 422 and/or a selected summary value 424. The selected summary text 422 and/or the selected summary value 424 may be obtained from the selection of a portion of the summary data visualization. More particularly, the selected summary text 422 and/or the selected summary value 424 may be those presented by the selected portion of the summary data visualization. The selected summary text 422 may include a single textual element such as a word, phrase, set of symbols, or the like. The selected summary value 424 may include a single value such as a number.

In alternative embodiments, the selected portion of the summary data visualization may include more than one value, each of which may be numeric, textual, and/or symbolic, etc. All such values may then be used as inputs for the system 400. In yet another alternative embodiment, a subset of the summary data visualization may not be selected; the entire summary data visualization may instead be selected. In such a case, all of the values presented by the summary data visualization may be used as inputs for the system 400.

According to some examples, the summary data 420 may be provided by the user 100 via the input device 102. Any known method of providing input may be used, including pointing, tapping, typing, dragging, and/or speech. The summary data 420 may consist of a user action that selects a portion of the summary data presented in the summary data visualization, hence providing the selected summary text 422 and/or the selected summary value 424. As mentioned previously, in alternative embodiments, more than one value may be selected. In further alternatives, the entire summary data visualization may be selected.

In certain embodiments, the selection may be provided by hovering with the mouse over the selected portion of the summary data visualization. This selection method will be further shown and described in connection with the examples of FIGS. 11A through 15B. Using a mouse hover as user input may provide unique advantages, including that the user need not click on anything to activate the method of the present invention and obtain the additional information desired. Further, it may be easy for the user to move the mouse over the summary data visualization, selecting a varying portion of the summary data visualization. The system 400 may provide, in response, information that continuously updates based on the portion of the summary data visualization over which the mouse is currently hovering. Other mechanisms can be used for providing a selection of a portion of the summary data visualization; for example, a user 100 can provide touch input, and/or the system can detect proximity of a user's finger to a touchscreen or other input device.

In other embodiments, the inputs to the system 400 may be provided without the input of the user 100 viewing the summary data visualization. For example, summary data 420 may be provided as part of a recurring or onetime system event. In such a case, the operation of the system 400 may be initiated, not by any action taken by the user 100 viewing the summary data visualization, but by a different trigger occurrence such as an action initiated by the device 101 and/or the client device 108, an action taken by a different user, the passage of a pre-established time interval, or the like.

In at least one embodiment, the system 400 may be a subscriber and/or a listener on an event bus in order to determine highlighting based on events. When an interaction with a summary data visualization takes place, the bus may register the occurrence of the event. The event may contain information about the data visualization; constituent visualizations, if related to the event, may display in a highlighted state and/or display relational information.

The information identification engine 410 may receive the summary data 420 may look for related information 450. The related information 450 may, in particular, include information related to constituent data used to obtain the summary data visualization, from the libraries 111.

Finding the related information 450 may be done, for example, by finding the data sets within the libraries 111 with metadata 210 with one or more elements in common with the metadata 310 of the summary data visualization. For example, if the summary data visualization is based on the first data set 109, the information identification engine 410 may search the metadata 210, and in particular the categories 216, the owner 218, and the relationship 219, for entries that match those of other data sets of the libraries 111. Further by way of example, if the nth data set 119 has a category 216, an owner 218, and/or a relationship 219 that is the same as the corresponding entry in the metadata 210 of the first data set 109, the information identification engine 410 may identify the nth data set 119 as a location in which at least some of the related information 450 is located, and may retrieve the corresponding portion of the related information 450 from the nth data set 119.

Additionally or alternatively, the information identification engine 410 may receive, from the process or module used to form the summary data visualization, an indication of which data sets of the libraries 111 were used. For example, a data visualization creation engine (not shown) may be used to create the summary data visualization. The information identification engine 410 may receive, from the visualization creation engine, an indication that the summary data visualization is based on data from the nth data set 119. Thus, the information identification engine 410 may identify the nth data set 119 as a location in which at least some of the related information 450 is located, and may retrieve the corresponding portion of the related information 450 from the nth data set 119.

As another alternative, the information identification engine 410 may obtain the constituent data from any constituent data visualizations that are displayed with or otherwise connected to the summary data visualization. Constituent data and/or related information may be retrieved from the metadata 310 and/or the various data series' of such a constituent data visualization.

Additionally or alternatively, the information identification engine 410 may use different methods to identify the related information 450. For example, keyword searching may be used to compare keywords present it the summary data visualization and/or its underlying data set with those of the data sets stored within the libraries 111. Other forms of syntax recognition, pattern recognition, and/or other logical processes may be used to identify the related information 450 among the data sets stored within the libraries 111.

As shown, the related information 450 may include several components. For example, the related information 450 may include a first constituent value 462 and optionally, one or more additional constituent values up to an nth constituent value 464. Additionally or alternatively, the related information 450 may include first constituent metadata 472 and optionally, additional constituent metadata up to nth constituent metadata 474.

The constituent values and/or metadata of the related information 450 may be retrieved from the data sets of the libraries 111 identified by the information identification engine 410 as having constituent data used to obtain the summary data visualization, or more specifically, the portion of the summary data visualization selected as part of the summary data 420. Thus, for example, the metadata 210 and/or the values of the first data series 220 through the nth data series 230 of each identified data set may be included as constituent values and/or metadata of the related information 450.

The first constituent value 462 through the nth constituent value 464 may be obtained from the various data series (for example, the first data series 220 through the nth data series 230 of the nth data set 119) of each identified constituent data set. The first constituent value 462 through the nth constituent value 464 may include numbers, characters, symbols, words, and/or any other form of information.

Similarly, the first constituent metadata 472 through the constituent metadata 474 may be obtained from the metadata 210 of the constituent data sets identified by the information identification engine 410 and/or the metadata 310 of any corresponding constituent data visualizations. The first constituent metadata 472 through the constituent metadata 474 may include information such as data set and/or data visualization titles, relationships, formulas, descriptions, categories, and the like.

If desired, the entirety of the constituent data sets identified by the information identification engine 410 may be included in the related information 450. However, it may be advantageous to only include the constituent data that relates to the summary data 420 that has been selected. This may enable the system 400 to present only the related information to the user 100 that bears most directly on the selected portion of the summary data visualization.

Thus, for example, if the nth data set 119 is a constituent data set identified by the information identification engine 410, the first constituent value 462 through the nth constituent value 464 may include only those values found in the nth data set 119 (such as in the first data series 220 through the nth data series 230) that relate to the selected summary value 424, or more specifically, are involved in the process used to obtain the selected summary value 424.

Once the related information 450 has been identified, the information identification engine 410 may obtain the necessary portions of the information 450. Notably, it may not be necessary to retrieve part or all of the related information 450 because some or all of the related information 450 may already be present in the view currently displayed for the user 100 and/or related views.

Once all of the related information 450 has been obtained, a display engine 480 may display and/or draw attention to the related information 450 and/or navigational elements used to view the related information 450. This display may be the output of the system 400.

The display engine 480 may perform one or more of a variety of tasks. In the event that the related information 450 is not currently displayed, the display engine 480 may provide displayed related information 490 consisting of the related information 450, displayed for the user 100. The related information 450 may be displayed in the form of an addition to the user's current view, an additional view available to the user 100 via a new navigational element (such as a tab or link), a popup window, or the like. The displayed related information 490 may be displayed in the form of a new data visualization, a list of items, a single informational element, or the like.

In addition or in the alternative to providing the displayed related information 490, the display engine 480 may provide one or more displayed related information graphical elements 492, which may serve to draw the attention of the user to a portion or all of the displayed related information 490. The displayed related information graphical elements 492 may include any of a variety of graphical elements including highlighting, cursor changes, arrows, circles, color changes, animation, and the like. Additionally or alternatively, the displayed related information graphical elements 492 may include audible elements such as sounds.

If the displayed related information 490 is newly displayed by the display engine 480, the displayed related information graphical elements 492 may not be needed, as the change in the display incident to provision of the displayed related information 490 may be sufficient to draw the attention of the user 100 to the displayed related information 490. Alternatively, the displayed related information graphical elements 492 may still be used to draw the attention of the user 100 to the fact that the displayed related information 490 has been provided.

If the related information 450 is already present in the view displayed to the user 100 (for example, the related information 450 is shown on the same view as the summary data visualization from which the summary data 420 were selected), the displayed related information graphical elements 492 may serve to draw the attention of the user 100 to the portions of the view that are or relate to constituents for the summary data 420. Such portions may or may not have been noticed by the user 100 prior to selection of the summary data 420.

In either case, the displayed related information graphical element 492 may draw attention to a particular portion of the related information 450. This may be done by highlighting, circling, animating, changing the color, or using other visual tools to direct the user's attention to the relevant portion. The portion of the related information 450 to which the user's attention is drawn may be the portion that corresponds to the selected portion of the summary data visualization. Thus, if the related information 450 is displayed as one or more data constituent visualizations, the user's attention may be drawn to the portion of each constituent data visualization that corresponds to the selected portion of the summary data visualization.

In addition to or in the alternative to providing the displayed related information 490 and/or the displayed related information graphical elements 492, the display engine 480 may provide one or more displayed new navigational elements 493 that can be used to navigate to and/or view the related information 450, whether the related information 450 was previously available, or is newly displayed by the display engine 480. Each displayed new navigational elements 493 may be a link, tab, menu item, or other newly-displayed feature that can be selected by the user 100 to enable the user to initiate display of the related information 450.

In addition to or in the alternative to providing the displayed related information 490, the displayed related information graphical elements 492, and/or the displayed new navigational element 493, the display engine 480 may provide one or more displayed navigational element graphical elements 494 that draw the attention of the user 100 to the navigational element(s) that can be used to navigate to and view the related information 450, whether the related information 450 was previously available, or is newly displayed by the display engine 480. Like the displayed related information graphical elements 492, the displayed navigational element graphical elements 494 may include highlighting, cursor changes, arrows, circles, color changes, animation, sounds, or any other combination of one or more graphical and/or audible elements. However, rather than directing the attention of the user 100 to the displayed related information 490, the displayed navigational element graphical elements 494 may direct the user's attention to the associated navigational element(s).

The displayed navigational element graphical elements 494 may be particularly useful in situations in which the display engine 480 does not provide a displayed new navigational element 493, but rather the related information 450 is available via a navigational element that was already displayed on the display screen. Where the display engine 480 displays the displayed new navigational element 493, the appearance of the new navigational element may be sufficient to draw the user's attention without the need for the displayed navigational element graphical elements 494.

One of skill in the art will recognize that the display engine 480 may display information, graphical elements, and/or navigational elements not specifically set forth in the description above. Exemplary versions of the displayed related information 490, the displayed related information graphical elements 492, the displayed new navigational element 493, and/or the displayed navigational element graphical elements 494 will be shown and described in greater detail subsequently in connection with examples.

Automatic Related Information Identification and Presentation

Figure 5:
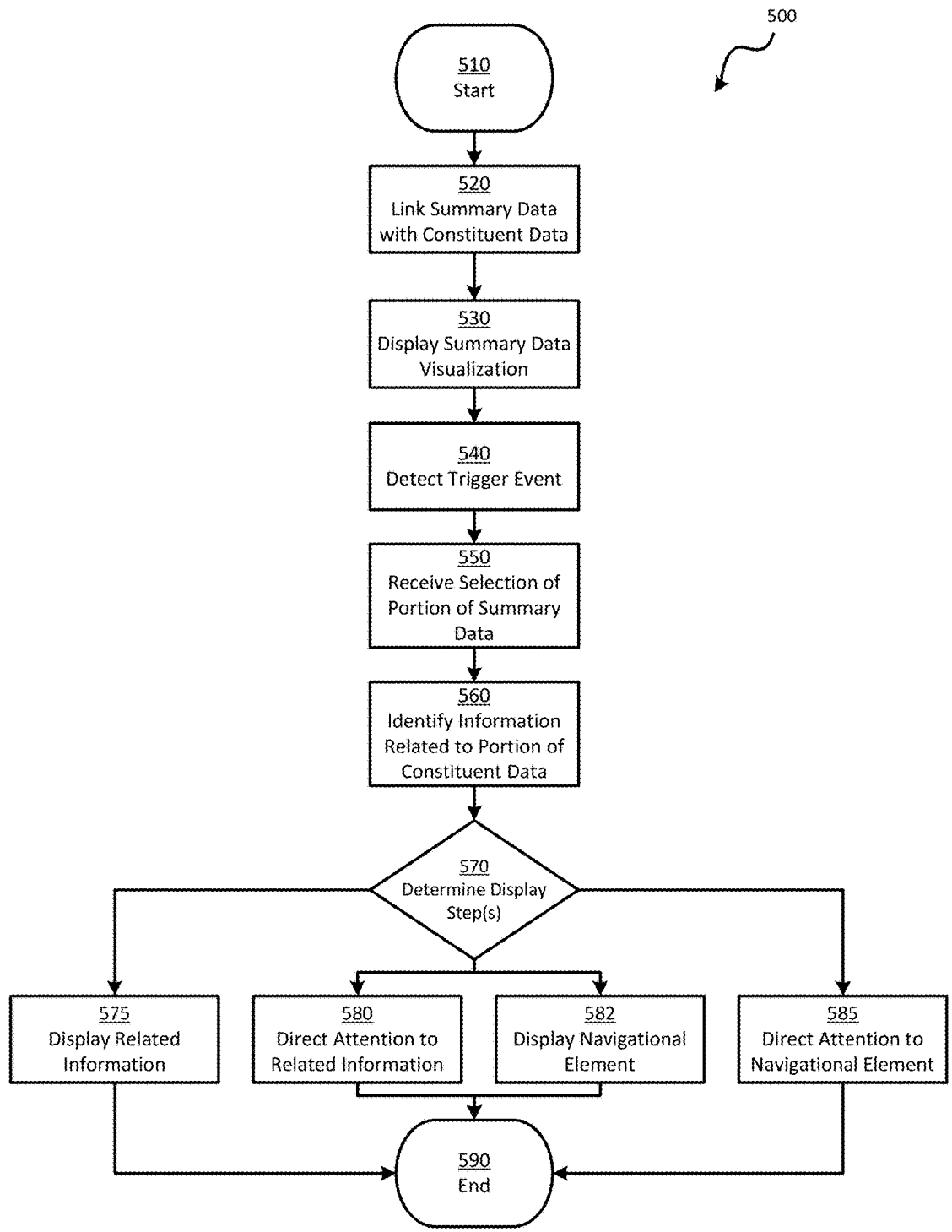
FIG. 5 is a flowchart depicting a method of carrying out automatic information provision, according to one embodiment of the present invention.

FIG. 5 is a flowchart depicting a method 500 of automatic information provision according to one embodiment of the present invention. The method 500 may be carried out, at least in part, by the system 400 as in FIG. 4, or with a differently-configured information provision system. The method 500 may be performed in connection with input from a user; such a user may be a developer, customer, enterprise leader, sales representative for business intelligence services, or any other individual. FIG. 5 illustrates a series of steps in a certain order, but those of skill in the art will recognize that these steps may be reordered, omitted, replaced with other steps, or supplemented with additional steps, consistent with the spirit of the invention.

The method 500 may start 510 with a step 520 in which summary data is linked to its constituent data. This may be done by, for example, providing entries in the metadata 210 of the various data sets, such as the first data set 109 through the nth data set 119, of the libraries 111 to establish which of the data sets are related. Links between data sets may be established by entering categories 216 and/or owners 218 in the metadata 210 of the data sets that establish common groupings. Additionally or alternatively, relationships may be more explicitly entered as relationships 219 within the metadata 210 (for example, by making an entry in the relationships 219 of the metadata 210 of the nth data set 119 to indicate the nth data set 119 has constituent data for the first data set 109). This process may be automated via text searching, artificial intelligence, or the like. Alternatively, the user 100 and/or other users may enter the links manually in the data sets within the libraries 111.

The step 520 is optional, as the step of linking may be carried out in real-time by the information identification engine 410. Some of the methods by which the information identification engine 410 may identify the related information 450 do not require the presence of an explicit link between the summary data 420 and the constituent data of the related information 450. However, providing such an explicit link may help facilitate and/or expedite the operation of the information identification engine 410. This may, in turn, reduce any lag time experienced by the user 100 between the trigger event (such as selection of the summary data 420) and the display by the display engine 480 of the displayed information 490, the displayed related information graphical elements 492, the displayed new navigational element 493, and/or the displayed navigational element graphical elements 494.

After the summary data and constituent data have been linked in the step 520 (or if the step 520 is omitted), the method 500 proceeds to a step 530 in which the summary data visualization is displayed for the user. The summary data visualization may be displayed alone or in combination with additional information, data visualizations, graphical elements, and/or navigational elements. The summary data visualization may include a chart, graph, infographic, and/or any other known type of data visualization.

Once the summary data visualization has been displayed, the system 400 may listen for and, in a step 540, detect the occurrence of a trigger event. As mentioned previously, the trigger event may be the selection by the user 100 of a portion of the summary data visualization, an action taken by a different user, a system event, or the like.

Once occurrence of the trigger event has been detected, the method 500 may proceed to a step 550 in which the selection of a portion of the summary data visualization is received by the system 400. The portion may be selected by the user, which selection may be the trigger event. Alternatively, the portion of the summary data visualization may occur via a system event, the action of a different user not currently viewing the summary data visualization, or the like.

If the portion of the summary data visualization is selected by the user 100, the user 100 may be presented by the system 400 with a cue such as a cursor change, pop-up message, pop-up icon, information retrieval icon, data visualization highlighting, a sound, and/or any other GUI and/or text element that indicates and/or display of the related information 450. The user 100 may then be able to confirm that he or she desires to retrieve and/or display the information.

Alternatively, the system 400 may operate without the need for any explicit user input (i.e., user input that specifically directs the system 400 to retrieve and/or display the information). Thus, the user may direct his or her input activities to other actions, while benefiting from the enhanced information display provided by the system 400. In some embodiments, the selection of the portion of the summary data visualization may be determined by the system 400 (or some other component of the device 101 and/or the client device 108) and not by the user 100.

According to one example, the selection of the portion of the summary data visualization may be determined by the current date. Thus, when viewing a summary data visualization indicating actual and projected profits for the current year, the current date may automatically be selected. The system 400 may receive that selection and, automatically, provide related information specific to that date. Alternatively, the selection may be determined by a previous date such as an acquisition or management transition date. As another alternative, the selection may be a future date such as an acquisition date, the end of a fiscal or calendar period, or the like.

According to other examples, the selection of the portion of the summary data visualization may be determined based on goals or other criteria set within the system 400. Thus, the summary data visualization may have an automated selection indicating the last time when a certain goal was achieved and/or a future date when it is projected to be achieved, or the like.

According to yet other examples, the selected portion of the summary data visualization may be determined based on the occurrence of events tracked by and/or reported on to the system 400 in real-time. For example, if the summary data visualization relates to sales data occurring in real-time (i.e., with a continuous update or an update occurring at a regular, relatively small interval), when a given sales metric is reached, the portion of the summary data visualization indicating occurrence of this event may be automatically selected.

Those of skill in the art will recognize that a portion of a summary data set may be selected according to many other methods. Any such methods may be used as trigger events that initiate the operation of the system 400. Alternatively, the trigger event and the selection of the portion of the summary data visualization may occur as separate, distinct events.

Once the system 400 has received the selection of the portion of the summary data visualization for which additional information is to be provided, the method 500 may progress to a step 560 in which the related information 450 is identified by the information identification engine 410. This may be done in any of a wide variety of ways as set forth in the description of FIG. 4. The step 560 may include retrieval of any portions of the related information 450 that need to be obtained, for example, from the libraries 111.

Once the related information 450 has been identified and/or retrieved, the method 500 may progress to a determination 570 in which the system 400 determines how the display engine 480 will provide the related information 450. The determination 570 may determine that any one, two, three, or all four of a step 575, a step 580, a step 582, and a step 585 may be carried out.

In the step 575, the display engine 480 may provide the related information 450 in the form of newly displayed related information 490. In the step 580, the display engine 480 may provide the related information 450 by providing displayed related information graphical elements 492 used to draw the attention of the user 100 to the related information 450. In the step 582, the display engine 480 may provide the related information by providing a displayed new navigational element 493. Selecting the navigational element may enable the user to navigate to and/or view the related information 450. In the step 585, the display engine 480 may provide the related information 450 by providing displayed navigational element graphical elements 494 that direct the attention of the user 100 to one or more navigational elements by which the user 100 can navigate to and/or view the related information 450. These steps are described in greater detail in connection with FIG. 4.

The determination 570 may include determining whether the related information 450 and/or a navigation element leading to the related information 450 is already displayed on the display screen 103. If the related information 450 is already displayed, there may be no need to carry out the step 575, the step 582, or the step 585, so the method 500 may only carry out the step 580 by directing the attention of the user to the related information 450 that has already been displayed.

The determination 570 may further include determining whether a navigational element leading to the related information 450 is already displayed on the display screen 103. If the related information 450 has not been displayed, but a navigational element leading to the related information 450 has been displayed, there may be no need for the step 582. The method 500 may proceed to the step 585 to draw the user's attention to the existing navigational element. Alternatively, the method 500 may perform the step 575 and/or the step 580 to make the related information 450 more readily available and/or apparent to the user.

If the determination 570 indicates that the related information 450 is not already displayed on the display screen 103 and a navigational element leading to the related information 450 is not currently displayed on the display screen 103, the step 575 and/or the step 582 may be performed. If the step 575 is performed, the step 580 may optionally be performed as an adjunct to the step 575 to draw the attention of the user to the displayed related information 490. Similarly, if the step 582 is performed, the step 585 may optionally be performed as an adjunct to the step 582 to draw the attention of the user to the displayed new navigational element 493.

The method 500 may perform only one of the step 575 and the step 582, or may perform both the step 575 and the step 582. The step 575 and the step 582 may both be performed, for example, by causing the display engine 480 to provide the displayed related information 490 and a displayed new navigational element 493 that the user can select to navigate back to the displayed related information 490 after navigating elsewhere, or to navigate to the related information 450 displayed in a different form than in the displayed related information 490.

Once the display engine 480 has performed the step 575, the step 580, the step 582, and/or the step 585, the method 500 may end 590. The method 500 may be re-initiated if a different portion of the summary data visualization (or a different summary data visualization) is selected and/or the trigger event occurs again.

In at least one embodiment, the system 400 may hide the displayed related information 490, the displayed related information graphical elements 492, the displayed new navigational element 493, and/or the displayed navigational element graphical elements 494 until the system 400 is placed into an "audit" or "trace" mode. Upon entering the "audit" mode, the various information and/or graphical elements may be displayed as set forth above.

Some of the steps shown and described in connection with FIG. 5 may be optional, and some may be re-ordered and/or replaced with other steps. FIGS. 6-10 illustrate methods that may be used to supplement the method 500 and/or replace portions of the method 500, as follows.

Figure 6:
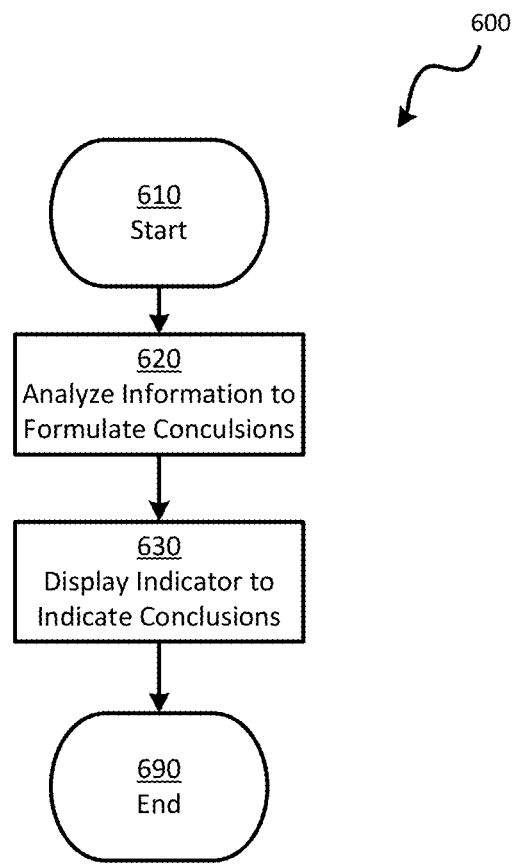
FIG. 6 is a flowchart depicting a method for information analysis and indicator display according to one embodiment of the invention.

FIG. 6 is a flowchart depicting a method 600 for information analysis and indicator display according to one embodiment of the invention. If desired, the system 400 may be designed to not only provide the related information 450 through the performance of the step 575, the step 580, and/or the step 585, but the system 400 may also, in step 620, analyze the related information 450 to formulate one or more conclusions that may be helpful to the user 100. The method 600 may start 610 with the step 620.

Once the conclusions have been formulated, in a step 630, an indicator may be displayed to indicate the conclusions to the user. The step 620 may be carried out prior to the step 575, the step 580, and/or the step 585, and the step 630 may be performed in conjunction with and/or simultaneously with the step 575, the step 580, and/or the step 585 so that the indicator is part of the displayed related information 490, the displayed related information graphical elements 492, the displayed new navigational element 493, and/or the displayed navigational element graphical elements 494.

For example, a constituent value that increases the selected summary value 424 may be shown with one color, while a value that decreases the selected summary value 424 may be shown in a different color. These indicators (i.e., the colors) may help the user to easily recognize contributors to and detractors from the selected summary value 424. In addition to or in place of colors, indicators may include symbols, animations, or other elements that convey the conclusions of the analysis to the user 100.

Alternatively, a constituent value that has a relatively large effect on the selected summary value 424 may be indicated. Constituent values that have relatively little or no impact may have other indicators, or may not have indicators at all. Those of skill in the art will recognize that a wide variety of other analysis and/or indication steps may be carried out on the related information 450 to provide useful information to the user 100. After performance of the step 630, the method 600 may end 690.

Figure 7:
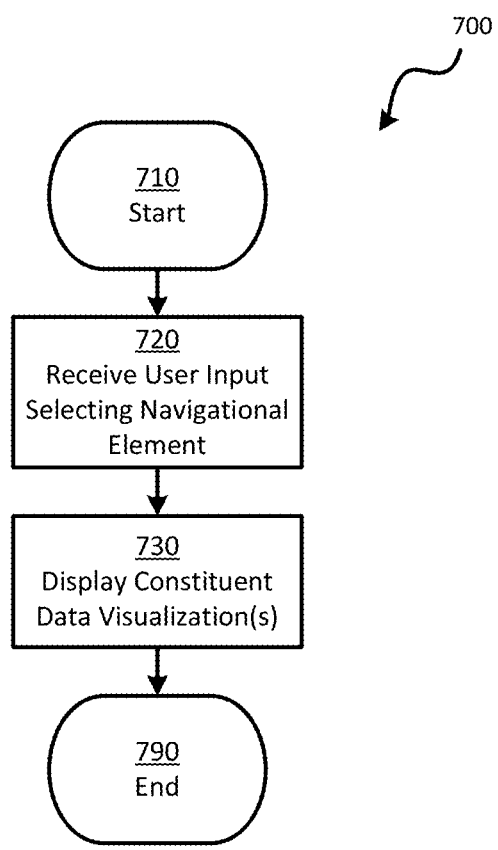
FIG. 7 is a flowchart depicting a method for displaying a constituent data visualization according to one embodiment of the invention.

FIG. 7 is a flowchart depicting a method 700 for displaying a constituent data visualization according to one embodiment of the invention. In the event that the display engine 480 performs the step 585 by providing the displayed navigational element graphical elements 494, the method 700 may enable the user 100 to navigate to and/or view the related information 450.

The method 700 may start 710 with a step 720 in which the system 400 (or a different module of the device 101 and/or the client device 108) receives user input selecting the navigational element to which the attention of the user 100 is directed by the displayed navigational element graphical elements 494. This may occur when the user 100 clicks on, hovers over, tabs to, or otherwise selects the navigational element.

After the user input selecting the navigational element has been received in the step 720, the method 700 may proceed to a step 730 in which one or more constituent data visualizations are displayed for the user 100. The constituent data visualizations may advantageously be similar in format and scope to the summary data visualization so that the understanding held by the user 100 of the summary data visualization may readily carry over to the constituent data visualizations. If desired, the constituent data visualizations may be displayed next to, overlying, or otherwise in association with the summary data visualization. The method 700 may then end 790.

Figure 8:
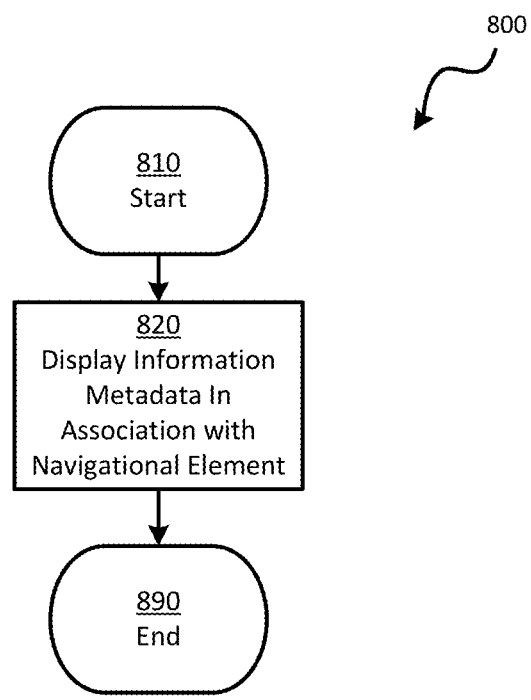
FIG. 8 is a flowchart depicting a method for displaying metadata in association with a navigational element according to one embodiment of the invention.

FIG. 8 is a flowchart depicting a method 800 for displaying metadata in association with a navigational element according to one embodiment of the invention. In the event that the display engine 480 performs the step 585 by providing the displayed navigational element graphical elements 494, the method 800 may facilitate understanding by the user 100 of the related information 450 without requiring the user 100 to select the navigational element.

More specifically, in the method 800 may start 810 with a step 820 in which metadata (such as one or more selections from the first constituent metadata 472 through the nth constituent metadata 474) and/or other data from the related information 450 may be displayed for the user 100 in association with the navigational element. This metadata may provide the user 100 with an indication of the remainder of the related information 450. The metadata displayed may thus include a summary, category, owner, relationship, and/or any other subset of the related information 450 that may help the user 100 either obtain the information he or she desires without having to select the navigational element and/or determine whether that information can be obtained by selecting the navigational element.

Figure 9:
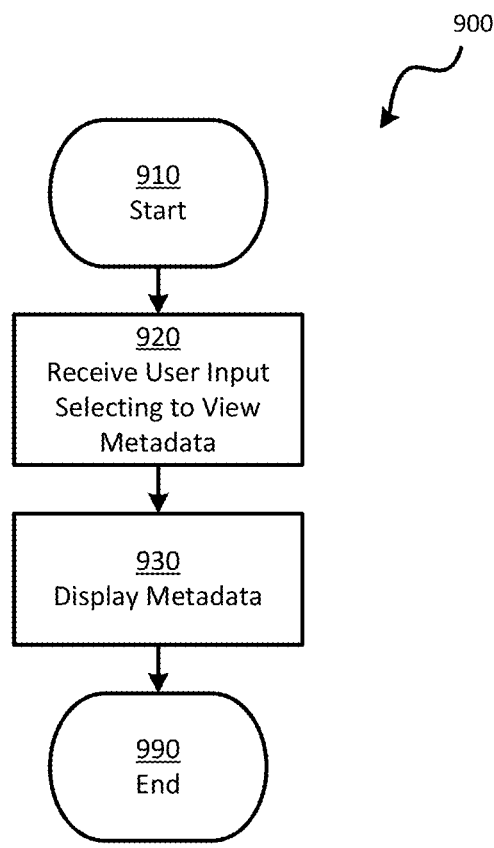
FIG. 9 is a flowchart depicting a method for displaying, in response to user input, metadata in association with a navigational element according to one embodiment of the invention.

FIG. 9 is a flowchart depicting a method 900 for displaying, in response to user input, metadata in association with a navigational element according to one embodiment of the invention. In the event that the display engine 480 performs the step 585 by providing the displayed navigational element graphical elements 494, the method 900 may also, like the method 800, facilitate understanding by the user 100 of the related information 450 without requiring the user 100 to select the navigational element.

The method 900 may start 910 with a step 920 in which the system 400 receives user input selecting to view some or all of the metadata of the related information 450 (such as the first constituent metadata 472 through the nth constituent metadata 474). Such metadata may include a summary, category, owner, relationship, and/or any other subset of the related information 450 that may be helpful to the user 100, as set forth in the description of FIG. 8.

A dropdown menu, cue, or other feature may optionally be used to enable this selection. If desired, such a feature may be shown at or near the current position of the cursor on the display screen 103 so that the user 100 can rapidly make the selection to view the metadata.

Once the user selection to view the metadata is received in the step 920, the method 900 may proceed to a step 930 in which the metadata is displayed. If desired, the metadata may be displayed in a smaller window, translucent overlay, or other format that enables the user 100 to avoid navigating away from the summary data visualization in order to view the metadata. The metadata may additionally or alternatively be displayed on or near the navigational element so that the metadata is clearly connected to the remainder of the related information 450 that will be displayed if the navigational element is selected. Once the metadata has been displayed in the step 930, the method 900 may end 990.

Figure 10:
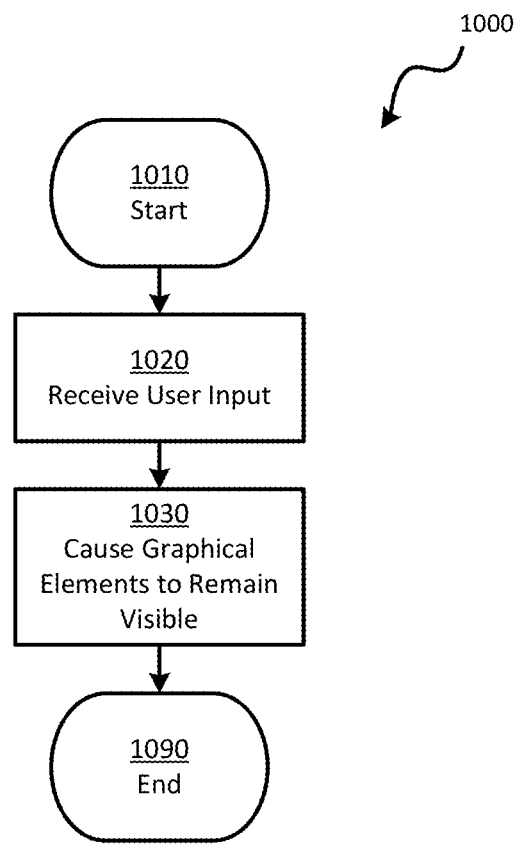
FIG. 10 is flowchart depicting a method for causing, in response to user input, graphical elements associated with navigational elements to remain visible, according to one embodiment of the invention.

FIG. 10 is flowchart depicting a method 1000 for causing, in response to user input, graphical elements associated with navigational elements to remain visible, according to one embodiment of the invention. In the event that the display engine 480 performs the step 580 by providing the displayed related information graphical elements 492 and/or the step 585 by providing the displayed navigational element graphical elements 494, the method 1000 may continue to facilitate understanding by the user 100 of the related information 450 while permitting further navigation and/or unrelated selections to take place.

More precisely, the method 100 may start 1010 with a step 1020 in which the system 400 receives user input selecting to keep some or all graphical elements visible. This selection may be particularly applicable to embodiments in which the user 100 selects the portion of the summary data visualization through the use of a mouse hover over the selected portion. Since the graphical elements may otherwise be displayed only while the mouse is hovering over the selected portion of the summary data visualization, the user may wish to keep the graphical elements visible to remember which navigational element to use, review metadata shown, or the like, while being able to perform other activities with the mouse.

As in the method 900, a dropdown menu, cue, or other feature may optionally be used to enable this selection. If desired, such a feature may be shown at or near the current position of the cursor on the display screen 103 so that the user 100 can rapidly make the selection to keep the graphical elements visible.

Once the user input has been received in the step 1020, the method 1000 may proceed to a step 1030 in which the system 400 causes the graphical elements to remain visible during further navigation and/or other activities, per the user input received. The method 1000 may then end 1090.

EXAMPLES

A wide variety of data visualizations, triggers, selection methods, information displays, and other aspects may be varied to generate a wide variety of embodiments of the invention. The following examples are presented by way of illustration and not limitation to indicate some of the ways in which a system, such as the system 400 of FIG. 4, may show and/or draw attention to information related to constituent data and/or navigational elements, according to the invention. For purposes of the discussion below, it will be assumed that the user 100 provides a trigger selecting the portion of the summary data visualization for which constituent information is desired.

Figure 11A:
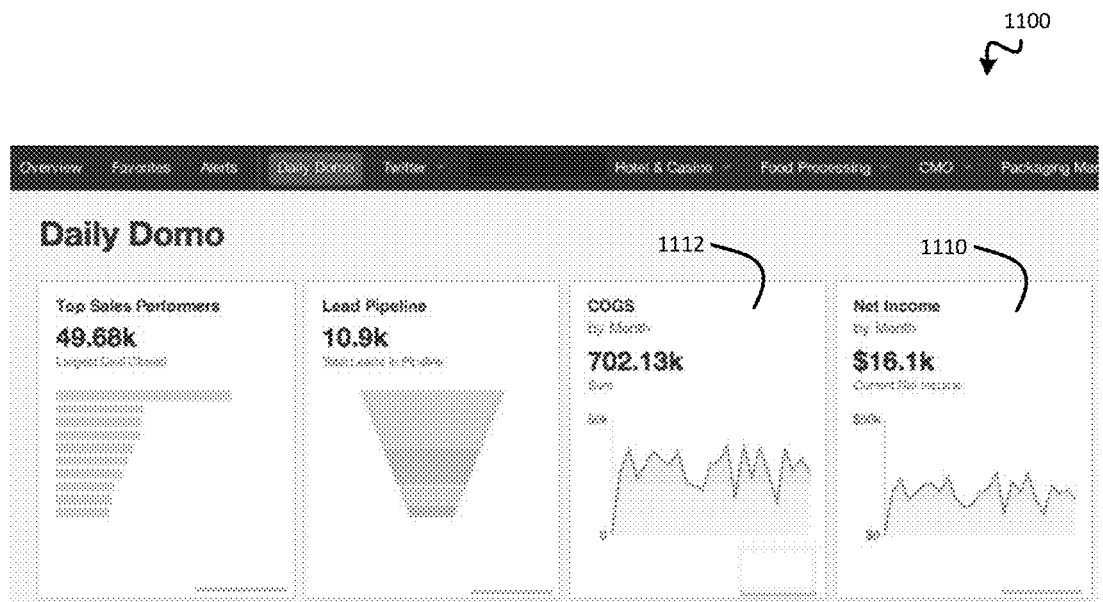
FIGS. 11A and 11B are screen shots depicting the display of information related to constituent data according to one example of the invention.
Figure 11B:
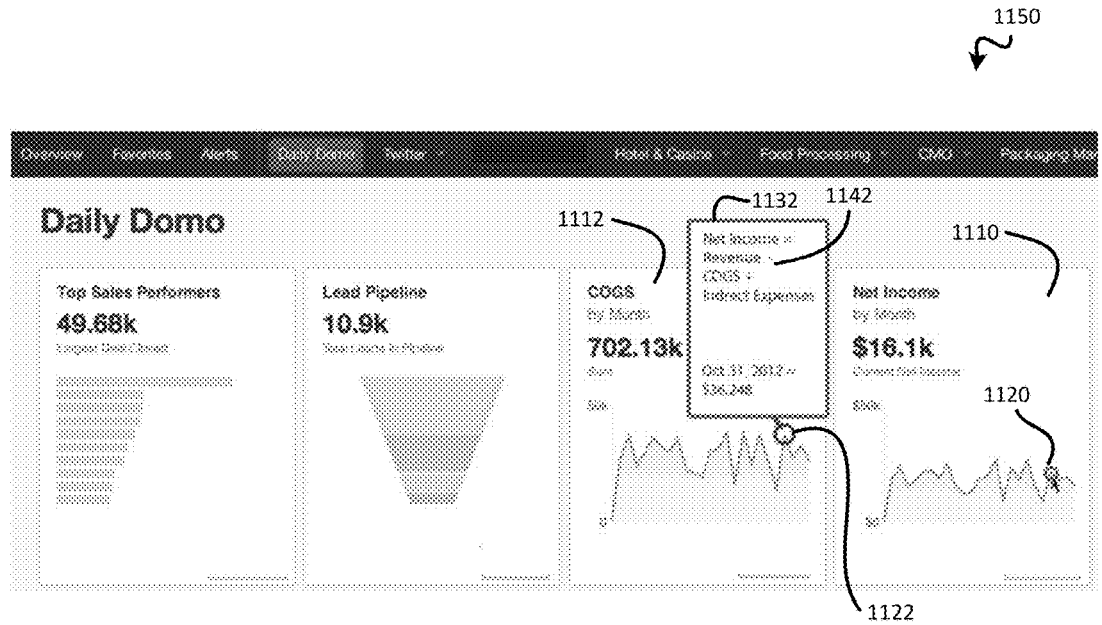

FIGS. 11A and 11B are screen shots 1100, 1150, respectively, depicting the display of information related to constituent data according to one example of the invention. More precisely, FIGS. 11A and 11B depict an example of highlighting a related measure with a formula relationship. FIG. 11A depicts the view that may be displayed for the user 100 before the user 100 causes a cursor to hover over an element of a summary data visualization in the form of a summary graph (the Net Income graph 1110).

In FIG. 11B, the user may cause the cursor to hover over a point 1120 in Net Income graph 1110. As shown, a displayed related information graphical element 492 in the form of a box 1132 may be displayed on the adjoining COGS graph 1112 (since COGS is a component of net income), showing the relationship 1142 between net income, revenue, COGS, and indirect expenses. The COGS graph may thus be a constituent data visualization in the form of a constituent graph showing constituent data for the summary data visualization (the Net Income graph). The portion 1122 of the COGS graph that corresponds to the selected portion of the Net Income graph may be highlighted with a circle.

Figure 12A:
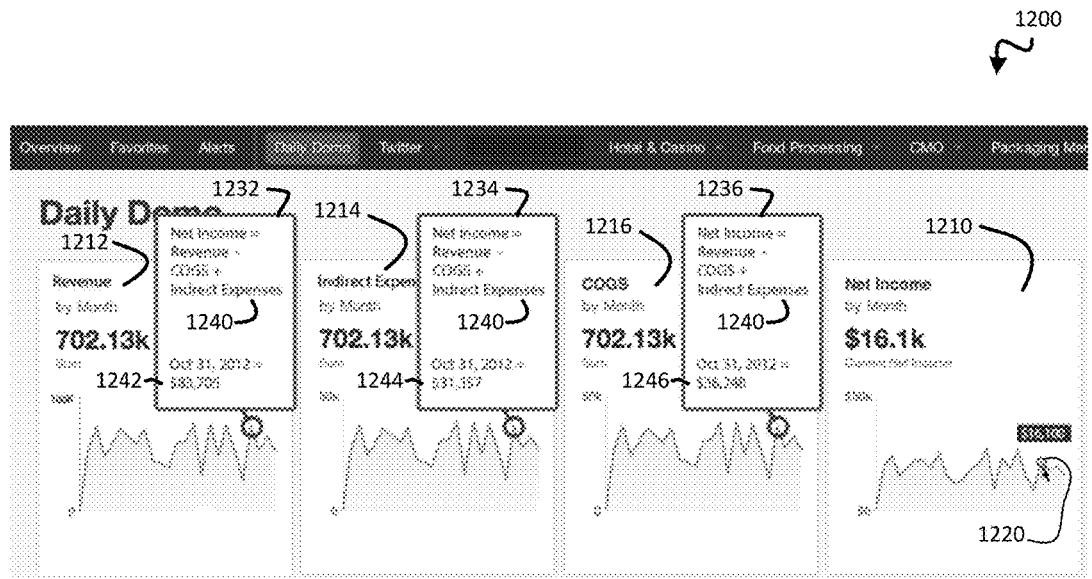
FIG. 12A is a screen shot depicting the display of information related to constituent data according to another example of the invention.

FIG. 12A is a screen shot 1200 depicting the display of information related to constituent data according to another example of the invention. More specifically, FIG. 12A depicts an example of drawing the user's attention to a portion of constituent data by highlighting multiple on-screen related items through the use of multiple displayed related information graphical elements 492. Again, the user may cause the cursor to hover over a point 1220 on the Net Income graph 1210. Since Revenue, Indirect Expenses, and COGS graphs 1212, 1214, 1216 are already displayed on the screen, similar boxes 1232, 1234, 1236 may be shown on each of those graphs, showing the relationship 1240 between Net Income, Revenue, COGS, and Indirect Expenses.

The relationship 1240 may provide an explanation of how the summary data presented in the Net Income graph 1210 are obtained from the constituent data presented in the Revenue, Indirect Expenses, and COGS graphs 1212, 1214, and 1216. The relationship 1240 may include a mathematical formula or equation as shown (Net Income=Revenue−COGS+Indirect Expenses), a verbal description of a relationship, and/or any other indication of how the summary data is obtained from the constituent data.

In addition, each box may show constituent data (constituent values of the first constituent value 462 through the nth constituent value 462) of the related information 450 in the form of the value 1242, 1244, 1246 for its measure at the date corresponding to the hover point. Therefore, in this example, since the user is hovering on the Net Income value 1220 for Oct. 31, 2012, the box 1232 on the Revenue graph may show the Revenue value 1242 on that date, the box on the indirect expenses graph may show the Indirect Expenses value 1244 on that date, and the box on the COGS graph may show the COGS value 1246 on that date.

Figure 12B:
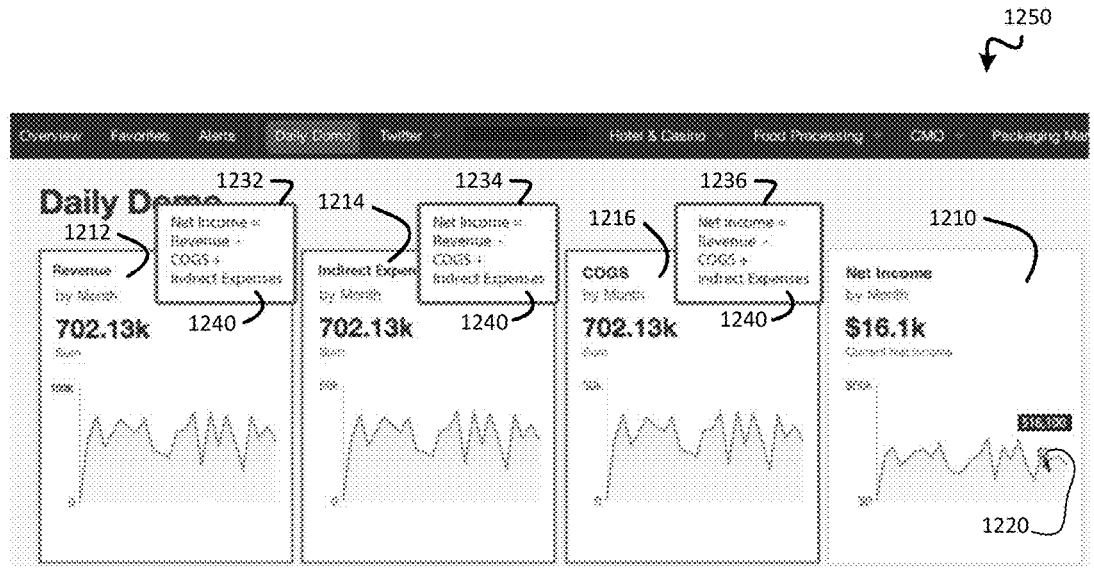
FIG. 12B is a screen shot diagram depicting the display of information related to constituent data according to another example of the invention.

FIG. 12B is a screen shot 1250 depicting the display of information related to constituent data according to another example of the invention. More specifically, FIG. 12B depicts another example, in which displayed related information graphical elements 492 are provided, in the form of the formula relationship 1240 between the summary data visualization and constituent data, in response to the user hovering on a point 1220 on the summary data visualization (again, the Net Income graph 1210). Specific values for the relevant date may be omitted.

The formula relationship 1240 may be metadata of the related information 450, such as metadata included in the first constituent metadata 472 through the nth constituent metadata 474. The formula relationship 1240 may originate from the relationships 219 of the metadata 210 of one or more of the data sets used to obtain the summary data visualization (the Net Income graph 1210). This display may indicate that there is a relationship 1240 with the Net Income graph 1210 as a whole (i.e., a relationship between the Net Income graph 1210 and the Revenue, Indirect Expenses, and COGS graphs 1212, 1214, 1216), rather than to a specific data point (the value 1220). Thus, although metadata may be available, data formulas may not be easily derived by the user 100.

Figure 13A:
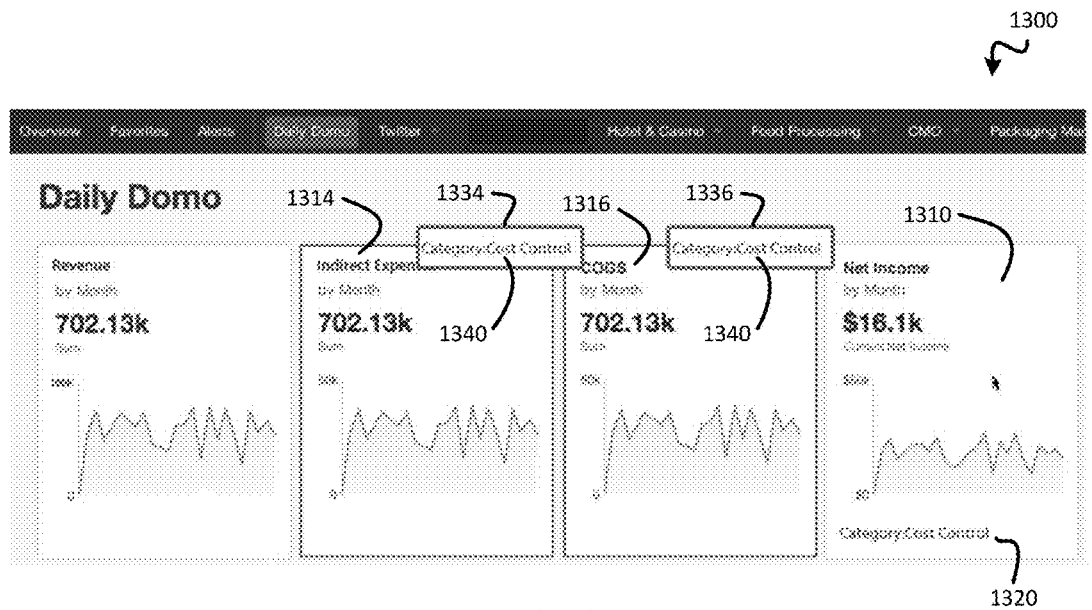
FIG. 13A is a screen shot depicting the display of information related to constituent data according to another example of the invention.

FIG. 13A is a screen shot 1300 depicting the display of information related to constituent data according to another example of the invention. More specifically, FIG. 13A may depict an example in which the user hovers over a Net Income data visualization 1310, or graph belonging to a cost control category. The data set underlying the Net Income graph may have metadata 210, or more specifically, a category 216, with the designation "cost control" or the like.

The cost control category may be shown at 1320 on the Net Income visualization 1310. Related visualizations (COGS 1314 and indirect expenses 1316) may be highlighted. Here, however, the relationship between the graphs 1310, 1314, 1316 may be based solely on the fact that the data sets underlying the COGS graph 1314 and the Indirect Expenses graph 1316 also have metadata 210 that includes a category 216 with the designation "cost control," or a related designation or category. Accordingly, the category (cost control) may be shown at 1340 in a box 1334, 1336 superimposed on the highlighted Indirect Expenses graph 1314 and on the highlighted COGS graph 1316, displaying the metadata, i.e., the common category 216. In other embodiments, data sets may be connected by other common elements shared by the data sets. Such common elements may optionally be stored within the metadata 210 of the data sets, as in the case of owners 218 and relationships 219.

Figure 13B:
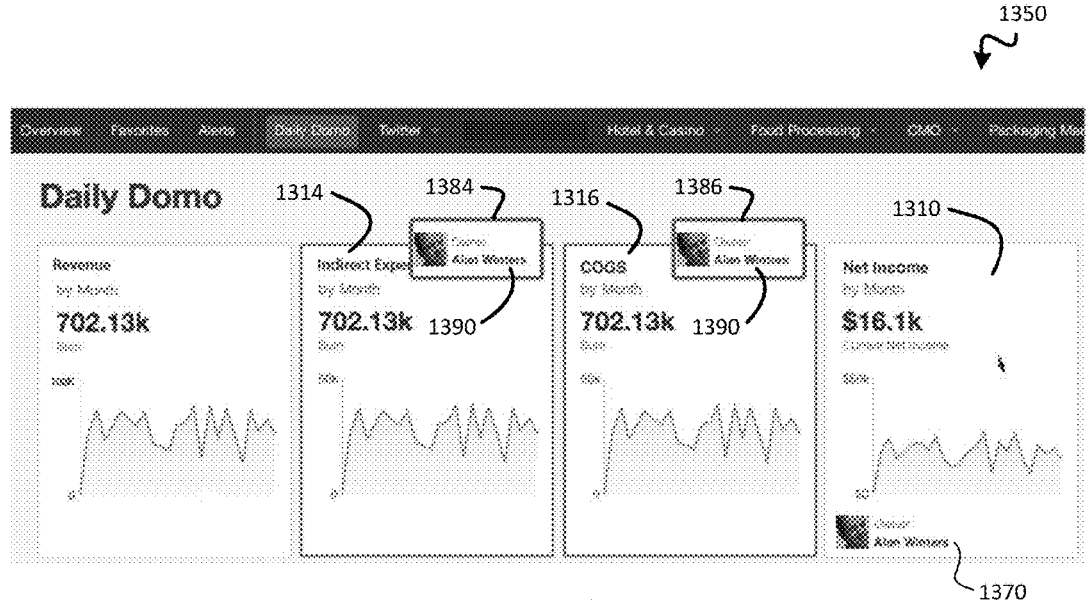
FIG. 13B is a screen shot depicting the display of information related to constituent data according to another example of the invention.

FIG. 13B is a screen shot 1350 depicting the display of information related to constituent data according to another example of the invention. More specifically, the user may again hover over a Net Income data visualization (the Net Income graph 1310). The Net Income graph 1310 may have a user ownership attribute. This attribute may be stored in the metadata 210 for the data set from which the Net Income graph 1310 is created, or more specifically, in the owners 218.

The user ownership attribute may be shown at 1370 on the Net Income visualization. Related data visualizations (the COGS and Indirect Expenses graphs 1314 and 1316) may be highlighted. Here, however, the relationship between the COGS, Expenses, and Net Income graphs may be based solely on the fact that the graphs have the same user ownership attribute. Accordingly, metadata in the form of the user ownership attribute may be shown at 1390 in a box 1384, 1386 superimposed on the highlighted Indirect Expenses and COGS graphs 1314, 1316.

Figure 14A:
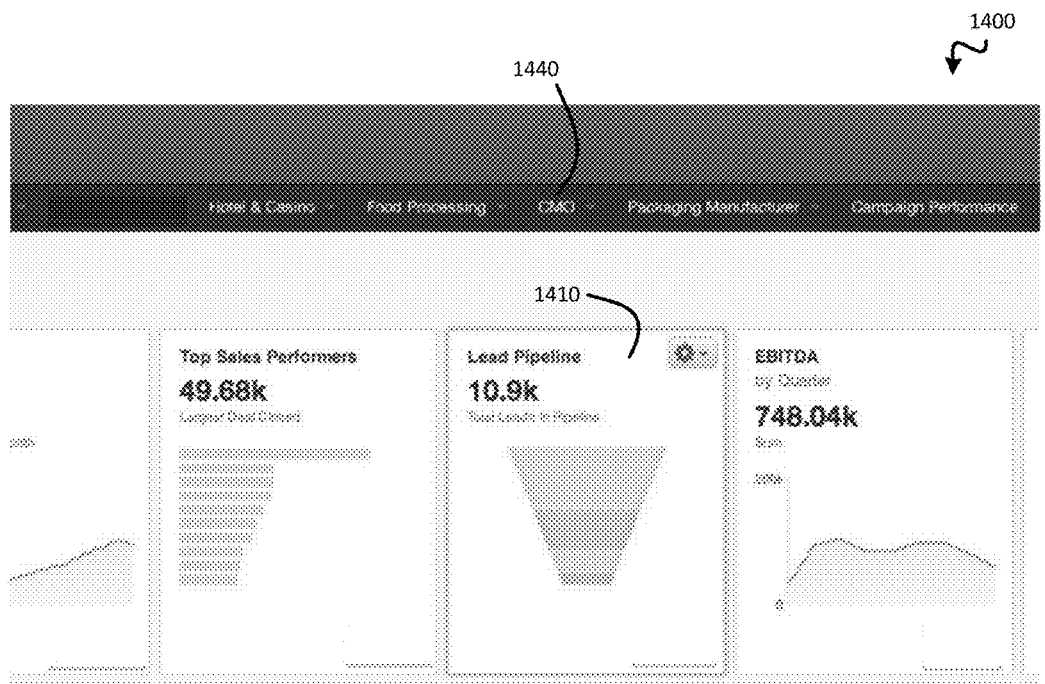
FIGS. 14A and 14B are screen shots depicting the display of information related to constituent data according to another example of the invention.
Figure 14B:
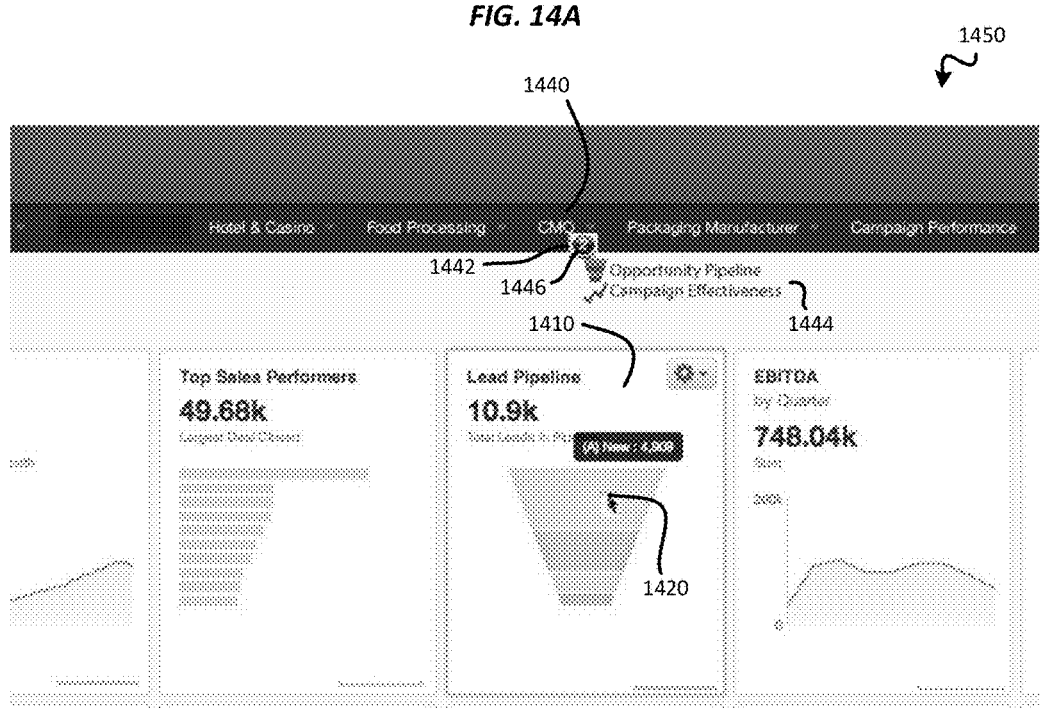

FIGS. 14A and 14B are screen shots 1400, 1450 depicting the display of information related to constituent data according to another example of the invention. More specifically, FIGS. 14A and 14B may depict an example of a displayed navigational element graphical element 494, which may include highlighting to direct the attention of the user 100 to related information 450 located off-screen from the summary data visualization.

FIG. 14A may depict the state before the user causes a cursor to hover over an element of a visualization. In FIG. 14B, the user may cause the cursor to hover over a point 1420 in the Lead Pipeline graph 1410 (the summary data visualization). A badge 1442 (a graphical element) may be displayed on the CMO tab 1440 to direct the attention of the user 100 to the CMO tab 1440, which may be the navigational element that leads to related information 450 used to obtain the summary data visualization.

Along with the badge 1442, metadata regarding the related information 450 available through that navigational element may be displayed. Such metadata may take the form of text 1444 indicating that the Opportunity Pipeline and the Campaign Effectiveness graphs on the CMO tab are related to the currently highlighted value in the Lead Pipeline graph 1410.

The badge 1442 and/or displayed metadata may serve to point the user 100 in the direction of those related graphs. The user 100 may then navigate to the related graph by clicking on or otherwise selecting the CMO tab 1440. The CMO tab 1440 and/or the badge 1442 may also show the number "2" at 1446, representing the number of charts related to the Lead Pipeline graph 1410.

In the alternative to providing a displayed navigational element graphical element 494 as described above, the example of FIGS. 14A and 14B may be modified so that a displayed new navigational element 493 is instead provided. For example, the CMO tab 1440 may initially not be displayed or may be suppressed until the cursor hovers over the hover point 1420. The CMO tab 1440 may then be displayed.

If desired, the badge 1442, the text 1444, and/or the number 2 1446 may also be displayed as in FIG. 14B. Alternatively, displaying the CMO tab 1440 may be sufficient to draw the attention of the user without also displaying additional graphical elements. If desired, the badge 1442, the text 1444, and/or the number 2 1446 may be displayed in response to a cursor hover over the new CMO tab 1440.

Figure 15A:
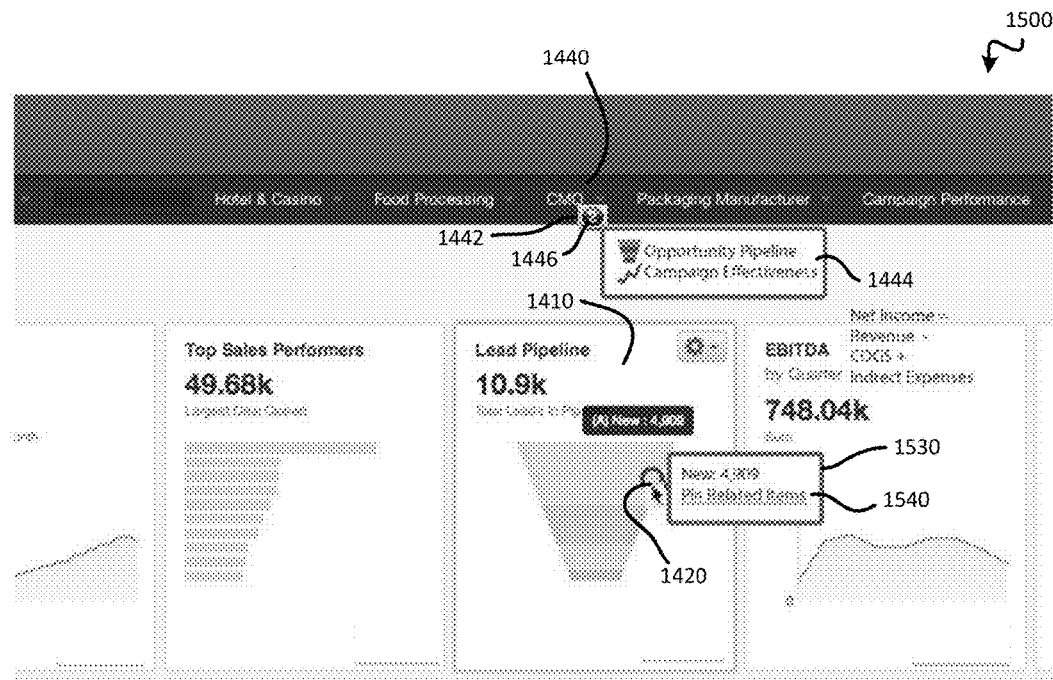
FIG. 15A is a screen shot depicting the display of information related to constituent data according to another example of the invention.

FIG. 15A is a screen shot 1500 depicting the display of information related to constituent data according to another example of the invention. More precisely, FIG. 15A may depict an example similar to that of FIG. 14B. However, in FIG. 15A, a "Pin Related Items" link 1540 may appear in a box 1530 next to the hover point 1420 on the Lead Pipeline graph 1410. Activating this link 1530 may cause the graphical element, i.e., the badge 1442, on CMO tab 1440 to remain in place even after user moves the cursor off of the value 1420 in Lead Pipeline graph 1410, thus allowing the user to interact with the highlighted content hover to discover more information about the off-screen content available without navigating to the off-display view, or to more easily navigate to the off-screen content.

Figure 15B:
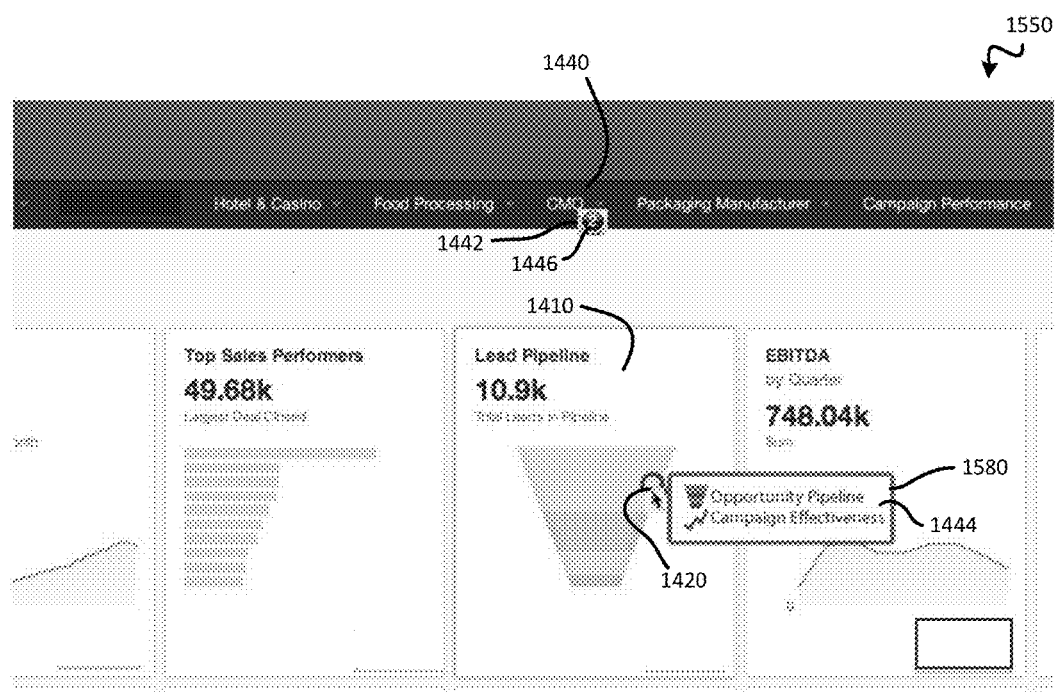
FIG. 15B is a screen shot depicting the display of information related to constituent data according to another example of the invention.

FIG. 15B is a screen shot 1550 depicting the display of information related to constituent data according to another example of the invention. More precisely, FIG. 15B may also depict an example similar to that of FIG. 14B. Here, however, the graphical elements (i.e., text 1444) indicating the related information 450 that is available off-screen (the Opportunity Pipeline and Campaign Effectiveness graphs) may be shown directly adjacent to the hover point 1420 rather than on the CMO tab 1440. A graphical element in the form of a badge 1442 may still be shown on CMO tab 1440 to inform the user of the navigation path to the related information 450. In at least one embodiment, the user may navigate to the related visualization by clicking on a highlight box 1580 adjacent to the hover point 1420, or by selecting the CMO tab 1440.

The highlight box 1580 may be a displayed new navigational element 493 as described in connection with FIG. 4. Accordingly, displaying the highlight box 1580 may constitute performance of the step 582 to provide the displayed new navigational element 493, which can be selected by the user to navigate to and/or display the related information 450.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for enhancing comprehension of a user of a summary data visualization, the method comprising: at a display device, simultaneously displaying a summary data visualization presenting summary data obtained from constituent data and two or more constituent data visualizations, the summary data including one or more values, and each of the two or more constituent data visualizations presenting the constituent data including related values related to the one or more values included in the summary data of the summary data visualization;

after simultaneously displaying the summary data visualization and the two or more constituent data visualization, receiving a selection of a summary value from the summary data presented by the summary data visualization;

at a processor, responsive to the selection of the summary value from the summary data presented by the summary data visualization, identifying mathematical operations between the selected summary value from the summary data visualization and two or more constituent values respectively presented by the two or more constituent data visualizations, the mathematical operations reflecting a manner in which the two or more constituent values are used to compute the selected summary value, the two or more constituent values being included in the constituent data; and at the display device, while simultaneously displaying the summary data visualization and the two or more constituent data visualizations, simultaneously highlighting in the summary data visualization and the two or more constituent data visualizations, using one or more graphical elements, the mathematical operations between the two or more constituent values of the two or more constituent data visualizations used to compute the selected summary value.

2. The method of claim 1, wherein the summary value is obtained by performing the mathematical operations on the two or more constituent values.

3. The method of claim 2, wherein simultaneously highlighting, using the one or more graphical elements, the mathematical operations between the two or more constituent values of the two or more constituent data visualizations further comprises:

highlighting the selected summary value in the summary data visualization and two or more corresponding data values in the two or more constituent data visualizations; and displaying via one or more of the graphical elements the mathematical operations in the manner that indicates to the user how the summary value is obtained from the constituent data.

4. The method of claim 1, wherein a portion of the summary data comprises summary metadata indicating what the summary value represents, a portion of the constituent data of each of the two or more constituent data visualizations comprises constituent metadata indicating what the constituent values represent, and one or more of the summary metadata and the constituent metadata of one or more of the two or more constituent data visualizations comprises the mathematical operations indicating how the summary value is obtained from the constituent data.

5. The method of claim 4, wherein simultaneously highlighting, using the one or more graphical elements, the mathematical operations the two or more constituent values of the two or more constituent data visualizations further comprises:

highlighting the selected summary value in the summary data visualization and two or more corresponding data values in the two or more constituent data visualizations; and displaying via one or more of the graphical elements, a representation of the mathematical operations that indicates to the user how the summary data is obtained from the constituent data.

6. The method of claim 1, wherein identifying the mathematical operations comprises:

identifying a common element shared by a portion of the summary data and a portion of the constituent data of each of the two or more constituent data visualizations.

7. The method of claim 1, further comprising:

prior to simultaneously displaying the summary data visualization and the two or more constituent data visualizations, establishing a link between the summary data and the constituent data of each of the two or more constituent data visualizations, wherein identifying the mathematical operations comprises identifying the link.

8. The method of claim 1, further comprising:

detecting an occurrence of a trigger event comprising a first user input, wherein receiving the selection comprises: at an input device, receiving the first user input designating the summary value.

9. The method of claim 8, wherein the summary data visualization comprises a summary graph, the two or more constituent data visualizations comprises two or more constituent graphs, the input device comprises a mouse or trackpad, the first user input comprises a hover over a portion of the summary graph that presents the summary value, and simultaneously highlighting in the two or more constituent data visualizations includes highlighting two or more corresponding portions of the two or more constituent graphs that present the two or more constituent values.

10. The method of claim 1, wherein the summary data visualization comprises a summary graph and the two or more constituent data visualizations comprise two or more constituent graphs, respectively.

11. The method of claim 10, wherein simultaneously displaying the summary data visualization and the two or more constituent data visualizations includes, at the display device, displaying each of the two or more constituent graphs adjacent to the summary graph.

12. The method of claim 1, wherein the processor and the display device are associated with a first subscriber to an event bus, and the method further comprises: detecting an occurrence of a trigger event comprising interaction of a second subscriber independent from the first subscriber with the summary data visualization, wherein the selection is received in response to the occurrence of the trigger event.

13. The method of claim 1, further comprising:
analyzing the mathematical operations to formulate conclusions regarding the two or more constituent values of the two or more constituent data visualizations, wherein simultaneously highlighting in the summary data visualization and the two or more constituent data visualizations, using the one or more graphical elements, includes at the display device, displaying an indicator in connection with the mathematical operations to indicate the conclusions to the user.

14. The method of claim 1, wherein simultaneously highlighting in the summary data visualization and the two or more constituent data visualizations, using the one or more graphical elements, the mathematical operations between the two or more constituent values of the two or more constituent data visualizations includes, at the display device, displaying the mathematical operations such that the mathematical operations are viewable simultaneously with the summary data visualization and the two or more constituent data visualizations, and directing attention of the user to the mathematical operations by highlighting the mathematical operations.

15. The method of claim 1, wherein simultaneously highlighting in the summary data visualization and the two or more constituent data visualizations, using the one or more graphical elements, the mathematical operations between the two or more constituent values of the two or more constituent data visualizations further comprises:
at an input device, receiving user input selecting to view metadata, wherein the metadata is displayed in response to the user input.

16. The method of claim 1, further comprising:
detecting an occurrence of a trigger event comprising a first user input, wherein receiving the selection comprises:
receiving the selection in response to the occurrence of the trigger event; and
at an input device, receiving the first user input selecting the summary value from the summary data, wherein the input device comprises a mouse or trackpad and the first user input comprises a hover over a portion of the summary data visualization that presents the summary value, and the method further comprises:
at the input device, receiving user input selecting to keep the one or more graphical elements visible; and
in response to receipt of the user input, causing the one or more graphical elements to remain visible after motion of the mouse away from the portion of the summary data visualization that presents the summary value.

17. A computer program product for enhancing comprehension of a user of a summary data visualization, comprising:
a non-transitory storage medium; and
computer program code, encoded on the non-transitory storage medium, configured to cause at least one processor to perform operations comprising:
causing a display device to simultaneously display a summary data visualization presenting summary data obtained from constituent data and two or more constituent data visualizations, the summary data including one or more values, and each of the two or more constituent data visualizations presenting the constituent data including related values related to the one or more values included in the summary data of the summary data visualization;
after simultaneously displaying the summary data visualization and the two or more constituent data visualizations, receiving, a selection of a summary value from the summary data presented by the summary data visualization;
responsive to the selection of the summary value from the summary data presented by the summary data visualization, identifying mathematical operations between the selected summary value from the summary data visualization and two or more constituent values respectively presented by the two or more constituent data visualizations, the mathematical operations reflecting a manner in which the two or more constituent values are used to compute the selected summary value, the two or more constituent values being included in the constituent data; and
while simultaneously displaying on the display device the summary data visualization and the two or more constituent data visualizations, simultaneously highlighting in the summary data visualization and the two or more constituent data visualizations, using one or more graphical elements, the mathematical operations between the the two or more constituent values of the two or more constituent data visualizations used to compute the selected summary value.

18. The computer program product of claim 17, wherein the summary value is obtained by performing the mathematical operations on the two or more constituent values, and simultaneously highlighting the mathematical operations comprises:
highlighting the selected summary value in the summary data visualization and two or more corresponding data values in the two or more constituent data visualizations; and
displaying, using the one or more graphical elements, the mathematical operations in the manner that indicates to the user how the summary value is obtained from the constituent data.

19. The computer program product of claim 17, wherein a portion of the summary data comprises summary metadata indicating what the summary value represents, a portion of the constituent data comprises constituent metadata indicating what the constituent values represent, and one or more of the summary metadata and the constituent metadata of one or more of the two or more constituent data visualizations comprises the mathematical operations indicating how the summary value is obtained from the constituent data, and simultaneously highlighting, using the one or more graphical elements, the mathematical operations between the two or more constituent values of the two or more constituent data visualizations further comprises: highlighting the selected summary value in the summary data visualization and two or more corresponding data values in the two or more constituent data visualizations, and displaying via one or more of the graphical elements, a representation of the mathematical operations that indicates to the user how the summary data is obtained from the constituent data.

20. The computer program product of claim 17, wherein identifying the mathematical operations comprises identifying a common element shared by a portion of the summary data and a portion of the constituent data of each of the two or more constituent data visualizations.

21. The computer program product of claim 17, wherein the computer program code is further configured to cause the processor to perform operations comprising:
   prior to simultaneously displaying the summary data visualization and the two or more constituent data visualizations, establishing a link between the summary data and the constituent data of each of the two or more constituent data visualizations, wherein identifying the mathematical operations comprises identifying the link.

22. The computer program product of claim 17, wherein the computer program code is further configured to cause the processor to perform operations comprising: detecting an occurrence of a trigger event comprising a first user input from an input device, and receiving the selection comprises receiving the first user input designating the summary value.

23. The computer program product of claim 22, wherein the summary data visualization comprises a summary graph, the two or more constituent data visualizations comprises two or more constituent graphs, the input device comprises a mouse or trackpad and the first user input comprises a hover over a portion of the summary graph that presents the summary value, and simultaneously highlighting in the two or more constituent data visualizations includes highlighting one or more corresponding portions of the two or more constituent graphs that present the two or more constituent values.

24. The computer program product of claim 17, wherein the summary data visualization comprises a summary graph.

25. The computer program product of claim 17, wherein simultaneously highlighting in the summary data visualization and the two or more constituent data visualizations, using the one or more graphical elements, the mathematical operations between the summary value of the summary data visualization, and the two or more constituent values of the two or more constituent data visualizations includes displaying the mathematical operations such that the is mathematical operations are viewable simultaneously with the summary data visualization and the two or more constituent data visualizations, and directing attention of the user to the mathematical operations by highlighting the mathematical operations.

26. A system for enhancing comprehension of a user of a summary data visualization, comprising:
   a display device, configured to:
      simultaneously display a summary data visualization presenting summary data obtained from constituent data and two or more constituent data visualizations, the summary data including two or more values, and each of the two or more constituent data visualizations presenting the constituent data including related values related to the one or more values included in the summary data of the summary data visualization;
   a processor, communicatively coupled to the display device, configured to:
      after simultaneously displaying the summary data visualization and the two or more constituent data visualizations, receive a selection of a summary value from the summary data presented by the summary data visualization; and
      responsive to the selection of the summary value from the summary data presented by the summary data visualization, identify mathematical operations between the selected summary value from the summary data visualization and two or more constituent values respectively presented by the two or more constituent data visualizations, the mathematical operations reflecting a manner in which the two or more constituent values are used to compute the selected summary value, the two or more constituent values being included in the constituent data, wherein
      the display device is further configured, while simultaneously displaying the summary data visualization and the two or more constituent data visualizations, to simultaneously highlight in the summary data visualization and the two or more constituent data visualizations using one or more graphical elements, the mathematical operations between the two or more constituent values of the two or more constituent data visualizations used to compute the selected summary value.

27. The system of claim 26, wherein the summary value is obtained by performing the mathematical operations on the two or more constituent values, and the display device is configured to highlight the selected summary value in the summary data visualization and two or more corresponding data values in the two or more constituent data visualizations, and display via one or more of the graphical elements the mathematical operations in the manner that indicates to the user how the summary value is obtained from the constituent data.

28. The system of claim 26, wherein a portion of the summary data comprises summary metadata indicating what the summary value represents, a portion of the constituent data of each of the two or more constituent data visualizations comprises constituent metadata indicating what the constituent values represent, one or more of the summary metadata and the constituent metadata of one or more of the two or more constituent data visualizations comprises the mathematical operations indicating how the summary value is obtained from the constituent data, and the display device being configured to simultaneously highlight the mathematical operations comprises:
   highlighting the selected summary value in the summary data visualization and two or more corresponding data values in the two or more constituent data visualizations, and
   displaying via one or more of the graphical elements, representation of the mathematical operations that indicates to the user how the summary data is obtained from the constituent data.

29. The system of claim 26, wherein the processor is configured to identify the mathematical operations by:
   identifying a common element shared by a portion of the summary data and a portion of the constituent data of each of the two or more constituent data visualizations.

30. The system of claim 26, wherein the processor is further configured to, prior to simultaneously displaying the summary data visualization and the two or more constituent data visualizations, establish a link between the summary data and the constituent data of each of the two or more constituent data visualizations and identify the mathematical operations by identifying the link.

31. The system of claim 26, wherein the processor is further configured to detect an occurrence of a trigger event comprising a first user input, and the system further comprises:
an input device, communicatively coupled to the processor, configured to receive the first user input designating the summary value.

32. The system of claim 31, wherein the summary data visualization comprises a summary graph, the two or more constituent data visualizations comprises two or more constituent graphs, the input device comprises a mouse or trackpad, and wherein the first user input comprises a hover over a portion of the summary graph that presents the summary value, and to simultaneously highlight in the two or more constituent data visualizations includes highlighting two or more corresponding portions of the two or more constituent graphs that present the one or more constituent values.

33. The system of claim 26, wherein the summary data visualization comprises a summary graph.

34. The system of claim 26, wherein the display device is configured to simultaneously highlight in the summary data visualization and the two or more constituent data visualizations, using the one or more graphical elements, the mathematical operations between the two or more constituent values of the two or more constituent data visualizations by:
displaying the mathematical operations such that the mathematical operations are viewable simultaneously with the summary data visualization and the two or more constituent data visualizations; and
directing attention of the user to the mathematical operations by highlighting the mathematical operations.

* * * * *